United States Patent
Rao et al.

(10) Patent No.: US 11,871,439 B2
(45) Date of Patent: *Jan. 9, 2024

(54) INTER-CELL FRACTIONAL FREQUENCY REUSE SCHEDULER

(71) Applicant: Parallel Wireless, Inc., Nashua, NH (US)

(72) Inventors: Prashanth Rao, Wilmington, MA (US); Murali Talluri, Shirley, MA (US); Praveen Puvvadi, San Francisco, CA (US); Mohit Chugh, Nashua, NH (US); Kaitki Agarwal, Westford, MA (US); Anoop Kumar, Pune (IN); Syed Intekhab Anjum, Pune (IN); Santosh Kumar Pandey, Pune (IN); Sharique Qureshi, Pune (IN); Rajesh Kumar Mishra, Westford, MA (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/539,048

(22) Filed: Nov. 30, 2021

(65) Prior Publication Data

US 2022/0167368 A1 May 26, 2022

Related U.S. Application Data

(63) Continuation of application No. 16/794,889, filed on Feb. 19, 2020, now Pat. No. 11,191,090, which is a
(Continued)

(51) Int. Cl.
*H04W 72/54* (2023.01)
*H04L 5/00* (2006.01)
(Continued)

(52) U.S. Cl.
CPC .......... *H04W 72/54* (2023.01); *H04L 5/0048* (2013.01); *H04L 5/0073* (2013.01); *H04W 24/02* (2013.01);
(Continued)

(58) Field of Classification Search
CPC ............. H04W 72/1231; H04W 28/16; H04W 84/045; H04W 72/1226; H04W 24/02;
(Continued)

(56) References Cited

U.S. PATENT DOCUMENTS 8,676,982 B2 3/2014 Lurie et al.
10,721,750 B2 * 7/2020 Rao ................... H04W 72/1231
(Continued)

FOREIGN PATENT DOCUMENTS

EP 2410706 A2 1/2012

*Primary Examiner* — Donald L Mills
(74) *Attorney, Agent, or Firm* — Michael Y. Saji

(57) ABSTRACT

Systems and methods are disclosed to address inter-cell interference in a heterogeneous network. In one embodiment, a system is disclosed, comprising: a coordinating node situated between a radio access network and a core network; and a first base station in the radio access network in communication with the coordinating node, wherein: the coordinating node has a coordinating scheduler with a first scheduling period; the first base station has a first base station scheduler with a second scheduling period shorter than the first scheduling period; the coordinating scheduler is configured to send a resource reservation list and a resource restriction list to the first base station scheduler once during each first scheduling period; and the first base station is configured to receive the resource reservation list and the resource restriction list and to use the resource reservation list and the resource restriction list when performing mobile device resource scheduling.

20 Claims, 10 Drawing Sheets

Related U.S. Application Data continuation-in-part of application No. 15/406,660, filed on Jan. 13, 2017, now Pat. No. 10,721,750.

(60) Provisional application No. 62/343,963, filed on Jun. 1, 2016, provisional application No. 62/278,319, filed on Jan. 13, 2016.

(51) Int. Cl.
| | | |
|---|---|---|
| *H04W 24/02* | (2009.01) | |
| *H04W 24/10* | (2009.01) | |
| *H04W 72/27* | (2023.01) | |
| *H04W 72/50* | (2023.01) | |
| *H04W 72/541* | (2023.01) | |

(52) U.S. Cl.
CPC ........... *H04W 24/10* (2013.01); *H04W 72/27* (2023.01); *H04W 72/535* (2023.01); *H04W 72/541* (2023.01)

(58) Field of Classification Search
CPC ............. H04W 24/10; H04W 72/0426; H04W 72/082; H04W 72/1257; H04L 5/0048; H04L 5/0073
See application file for complete search history.

(56) References Cited

U.S. PATENT DOCUMENTS

| | | | |
|---|---|---|---|
| 11,191,090 B2* | 11/2021 | Rao | H04W 24/10 |
| 11,212,820 B2* | 12/2021 | Rao | H04W 72/1231 |
| 2011/0255486 A1 | 10/2011 | Luo et al. | |
| 2013/0148620 A1 | 6/2013 | Nanri et al. | |
| 2013/0223373 A1* | 8/2013 | Damnjanovic | H04W 72/1289 370/329 |
| 2014/0050128 A1* | 2/2014 | Campoy Cervera | H04W 72/0426 370/280 |
| 2014/0198766 A1 | 6/2014 | Siomina et al. | |
| 2015/0349908 A1* | 12/2015 | Centonza | H04J 11/0053 370/328 |
| 2016/0270100 A1* | 9/2016 | Ng | H04L 1/1819 |
| 2016/0301447 A1* | 10/2016 | Park | H04L 25/0204 |

* cited by examiner

INTER-CELL FRACTIONAL FREQUENCY REUSE SCHEDULER

CROSS-REFERENCE TO RELATED APPLICATIONS

This application is a continuation of U.S. application Ser. No. 16/794,889, filed Feb. 19, 2020, which is a continuation-in-part of, and claims priority under 35 U.S.C. § 120 to, U.S. application Ser. No. 15/406,660, titled "Inter-Cell Fractional Frequency Reuse Scheduler" and filed on Jan. 13, 2017, which itself claims the benefit of priority according to 35 USC § 119(e) of both U.S. Provisional Patent Application No. 62/278,319, filed Jan. 13, 2016, and No. 62/343,963, filed Jun. 1, 2016, each having the title "Inter-Cell Fractional Frequency Reuse Scheduler," and hereby incorporates both of these applications by reference in their entirety for all purposes. Additionally, this application incorporates by reference in their entirety each of the following applications: U.S. Provisional Patent Application No. 62/037,982, filed Aug. 15, 2014, and entitled "Inter-Cell Interference Mitigation"; No. 62/166,401, filed May 26, 2015, and entitled "Inter-Cell Interference Coordination"; and U.S. Pat. App. Pub. Nos. US20140086120, US20140092765, US20140133456, US20150045063, and US20150078167. Additionally, 3GPP TS 36.331 and TS 36.213 are hereby incorporated by reference in their entirety for all purposes. In addition, U.S. Patent Publication No. 20190364616 A1; U.S. patent application Ser. No. 16/733,947; and International Patent Publication No. WO2019209922 are also hereby incorporated by reference in their entirety.

BACKGROUND

In cellular radio networks, a base station is needed to be placed in each region that requires coverage. Prior deployment strategies assumed a regular cell topology, resulting in the emplacement of radio base stations according to a strict geometric pattern. However, in real-world deployments, identically-sized cells are ill-suited to providing effective coverage because of topological features (i.e., mountains, hills, highways, etc.), and because of varying population density patterns, among other reasons.

To handle these varying characteristics, strategies involving multiple cell sizes in a heterogeneous network, or hetnet, have been proposed. For example, a traditional macro cell base station may be used to cover a relatively large area, but may be supplemented in an area of increased population density by a cell with a smaller coverage area. Such cells are variously called femto cells, pico cells, micro cells, or generically, small cells. The term femto cell is used in this disclosure to refer to one or more of these various types of cells.

However, integration of these base stations of various sizes causes interference between cells. This is particularly true because femto cells are often placed in a location that overlaps substantially or completely with the coverage area of a macro cell, e.g., in overlay or underlay coverage patterns. When a macro cell coverage area overlaps completely with a femto cell coverage area, without mitigation techniques, the femto cell base station and the macro cell base station necessarily ends up competing for radio resources and reducing the effectiveness of attached mobile nodes via inter-cell interference.

Additional challenges with small cell deployments include: little or no RF planning; cell coverage areas that are not well-defined or that do not conform to a standard circular or hexagonal cell shape; the requirement to coexist with existing macro cells; small radius for small cells, making soft frequency reuse less than straightforward; and the necessity of central coordination when using UE-centric resource allocation.

SUMMARY

Systems and methods may be disclosed to address the problem of inter-cell interference in a heterogeneous network.

In one embodiment, a system is disclosed, comprising: a coordinating node situated between a radio access network and a core network; and a first base station in the radio access network in communication with the coordinating node, wherein: the coordinating node has a coordinating scheduler with a first scheduling period; the first base station has a first base station scheduler with a second scheduling period shorter than the first scheduling period; the coordinating scheduler is configured to send a resource reservation list and a resource restriction list to the first base station scheduler once during each first scheduling period; and the first base station is configured to receive the resource reservation list and the resource restriction list and to use the resource reservation list and the resource restriction list when performing mobile device resource scheduling.

The resource reservation list and the resource restriction list may each be bitmaps of one byte per physical resource block (PRB). The resource restriction list may be a set of values indicating an interference level for each of a set of PRBs. The coordinating node may be configured to maintain an interference zone comprising a set of base stations. The resource restriction list may be pushed to each base station in the same interference zone. The coordinating node may be configured to assess interference based on received measurement reports from mobile devices. The coordinating scheduler and the first base station scheduler may be configured to exchange scheduling information for UEs deemed to be cell edge UEs, based on one or more values of reference signal received power (RSRP), reference signal received quality (RSRQ), cell quality indicator (CQI), and signal to noise ratio (SINR). The first scheduling period may be between 5 and 30 milliseconds and the second scheduling period may be 1 millisecond. The coordinating node may be in communication with a macro cell regarding resource allocation and scheduling over an X2 interface.

A second base station in the radio access network may also be present in the system and may be in communication with the coordinating node and may have its own scheduler. The first and second base stations may be Long Term Evolution (LTE) eNodeBs. The coordinating node may have an X2 interface connection to the first and second base stations for performing coordination between schedulers. The first base station may send a resource reservation to the coordinating node based on coordination activity performed with the second base station. The coordinating scheduler may be configured to: receive a resource reservation request from the first base station; add a corresponding resource reservation to the resource reservation list; and add a corresponding resource restriction to a second resource restriction list to be sent to the second base station. The coordinating scheduler may be configured to send a reduce transmit power instruction to the second base station based on the resource reservation list. The first base station scheduler may be configured to avoid use of resources identified in the resource restriction list. The first and second base stations may be multi-radio access technology (multi-RAT)

base stations having two or more of the following radio access capabilities: 2G; 3G; LTE; and Wi-Fi.

The concept of multiple radio access technology will also be defined. The term "radio access technology" indicates the type of radio technology used to access a core network. Multiple radio access technology, or multi-RAT, is a radio technology capable of operating in varying parameters. These varying radio parameters could be, for example, different protocols, different duplexing schemes, different media access methods, disparate frequency bands, and the like. The multi-RAT nodes, upon which SON embodiments operate are dynamic mesh nodes. A multi-RAT node may include one or more "Gs," including 2G, 3G, 4G, 5G and Wi-Fi. Where the present disclosure mentions any RAT, such as 2G/3G/4G/5G/Wi-Fi, it is understood that any other RAT could be substituted. E.g., any combination of 2 RATs, any combination of 3 RATs, etc. is enabled by the present disclosure; interworking between any 2 RATs is enabled by the present disclosure; virtualization of any RAT at the core (stand-alone or non-standalone) or at the RAN to appear as another RAT is enabled by the present disclosure; changing of operational parameters of any RAT based on environment variables of any RAT is contemplated; addition of one or more additional RF chains is contemplated, in some embodiments, to support the processing requirements of any particular RAT, which in combination with the multi-RAT architecture disclosed herein enables a multi-RAT node with any combination of RATs In another embodiment, a method is disclosed, comprising: creating a reservation for a resource enabling use of the resource at a first base station for a set of mobile devices; and requiring creation of a paired restriction for the resource disabling use of the resource at a second base station, the second base station being a neighbor of the first base station, thereby enabling the second base station to avoid interfering with use of the reserved resource by the first base station.

Creating a reservation and requiring creation of a paired restriction may occur at a coordinating node. The resource may be a physical radio resource or a scheduling slot. The resource may be either a 2G, 3G, 4G, or 5G radio carrier resource. The paired restriction may be a limit on the radio frequency (RF) power that is transmitted on a physical radio resource or in a scheduling slot. The coordinating node may be a radio network controlling node situated in communication with a radio access network and with a core network. The coordinating node may be a radio network controlling node providing virtualization of radio access network nodes. The first and second base stations may be Long Term Evolution (LTE) eNodeBs and the set of mobile devices may be either a set of universal mobile telecommunications service (UMTS) user equipments (UEs) or a set of LTE UEs.

DETAILED DESCRIPTION

To address the problem of inter-cell interference in a heterogeneous network, several methods and systems are disclosed for determining interference caused by an aggressor mobile node, and transmitting at appropriate times and with transmit power that does not cause interference. Techniques are described for fractional frequency reuse (FFR) and other types of inter-cell interference coordination (ICIC). In particular, interference is reduced for users at the edge of a base station's coverage region (called cell edge users). Interference in a given cell is reduced by coordination of potentially interfering transmissions from a base station in another cell. A centralized scheduler is used in conjunction with a scheduler at each individual base station to provide FFR.

Frequency reuse is fundamental to cellular technology and involves multiple transmitting stations using the same frequency simultaneously. Ordinarily, reuse is performed on the cell level, such that the same frequencies are available for use in other cells. However, with ICIC, a designated frequency band may be subdivided into multiple portions, some portions of which are available for use in other cells while other portions are not. This is called fractional frequency reuse (FFR).

Figure 1:
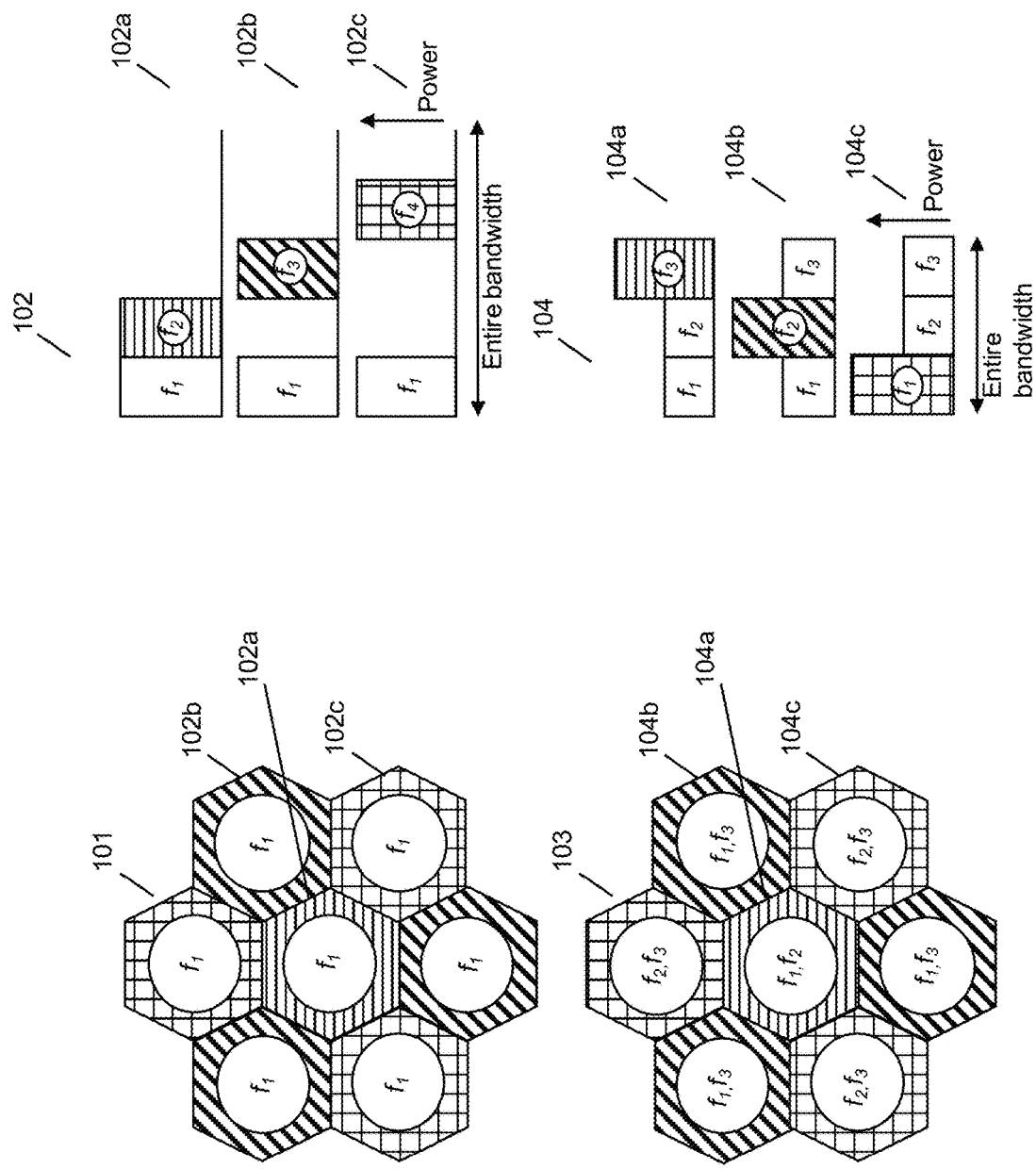
FIG. 1 is a schematic diagram of a cellular deployment scenario showing cell edge and cell center frequency sharing, in accordance with some embodiments.

FIG. 1 visually illustrates the reuse of frequencies in a FFR scheme. FIG. 1 is a schematic diagram of a cellular deployment scenario showing cell edge and cell center frequency sharing, in accordance with some embodiments. Coverage diagram 101 shows a scenario where frequency f1 is shared among all the cells shown, and is used in the cell center of each cell. This is shown in bandwidth and power diagram 102, where frequency f1 is shown as in use by cell 102a, 102b, and 102c, while cell 102a uses frequency f2, cell 102b uses frequency f3, and cell 102c uses frequency f4 for cell edge users. This does not scale well to a heterogeneous network, however, since a macro overlay network that uses frequency f1 for its cell center will make it difficult for smaller underlay cells to use frequency f1.

Coverage diagram 103 shows a scenario where each cell uses three frequencies, some combination of f1, f2, and f3. For any two neighboring cells, two of the three frequencies is used in the cell center, and a third frequency is used in the cell edge. The frequencies in the cell center are marked in the diagram as f1, f2, or f3, and the third frequency is indicated by the type of hatching used in the diagram. Bandwidth and power diagram 104 shows that, for any given cell, two frequencies are used at a lower power in the cell center and the third frequency is used at a higher power in the cell edge. In cell 104a, frequency f3 is used in the cell edge, while in cell 104b, frequency f2 is used in the cell edge, and in cell 104c, frequency f1 is used in the cell edge.

As is evident from coverage diagram 103, no two adjacent cells use the same frequency for the cell edge, enabling effective coverage and handover in the region between any given pair of cells.

In a scenario commonly referred to as Soft Frequency Reuse, one such portion is used in a particular cell, and other cells may still use said portion but at limited RF power. Typically, a portion of the frequency is allocated to cell edge users in one cell and reused in neighboring cells for cell center users at a lower power. Since cell center users are close to the transmitting station, the power-restricted portion of the frequency can be effectively used to serve such users even while transmitting at a reduced power level. FIG. 1 shows examples of soft frequency reuse.

When the reservation of such frequency resources changes with time, we have dynamic FFR as opposed to static FFR where reservations are set up for long periods of time. This application describes at least a Dynamic Soft FFR scheme below.

In some embodiments, interfering cells may be called aggressors, and the cells being interfered with may be called victim cells. A user equipment (UE) that causes interference may be called an aggressor, and a UE that is subject to interference may be called a victim.

In some embodiments described below, the term "cell edge user" is understood more generally to mean a user that is experiencing interference above a certain threshold, not a user that is necessarily located in any particular physical coverage zone, and the term "cell center user" is understood to mean a user that is experiencing interference only below the certain threshold. Fractional frequency reuse (FFR) methods are described herein that use this definition of cell edge user and cell center user. FFR refers to the re-use of only a fraction (f<1) of the total available frequencies, hence the name.

When the interfering resources are forbidden from being used in the neighboring cells, we have Hard Fractional Frequency Reuse. When such frequency resources are used in neighbor cells in a manner that does not cause degrading interference to the said UEs, we have Soft Frequency Reuse. In a typical scenario, a UE is attached to and receives data from one base station (which is the aggressor node), which generates interference on the downlink band for UEs attached to one or more neighboring base stations (victim nodes). Interference commonly occurs at the cell edge, not at the cell center, because at the cell center, the reduced distance to the base station provides a greater signal to noise ratio. It follows that the frequencies and time slots associated with the cell center are readily able to be reused, while frequencies and time slots associated with the cell edge are not reused but instead are reserved.

In some embodiments, an aggressor base station and a victim base station may each be in communication with a cloud coordination server, and the signal strength information for neighboring base stations may be shared among multiple eNodeBs, either via the cloud coordination server or directly using a mesh network connection or inter-eNodeB connection. By coordinating transmissions among multiple eNodeBs, interference may be reduced in one area without causing greater interference in another area.

A method is described herein for providing such coordination. Two key concepts are used, in some embodiments. Firstly, a reservation of a resource, such as a physical radio resource or scheduling slot, is enabled to be performed for a particular UE at a particular base station. Secondly, to avoid interfering with the reserved resource, each reservation is created with a corresponding restriction of use of the reserved resource in all neighboring base stations. Paired creation of a reservation and restriction is facilitated at a central coordination server.

In some embodiments, a coordinating node situated between the radio access network and the core network may be coupled with each of a first and a second base station, which may be LTE base stations (eNodeBs), and which may also be equipped with additional wireless capability, such as Wi-Fi backhaul and/or access capability. More base stations may be present, in some embodiments. The coordinating node may have an X2 interface connection to each base station. The coordinating node may be a heterogeneous network gateway, and may provide X2 and S1 proxying and brokering services for a plurality of connected eNodeBs, such that the hetnet gateway provides access to the core network for a plurality of connected eNodeBs. The coordinating node may thus be in the data path between the connected eNodeBs and the core network.

In some embodiments, the connected eNodeBs may be multi-radio access technology, heterogeneous network eNodeBs. The connected eNodeBs may be mobile eNodeBs with integrated wireless backhaul, including LTE protocol-based or Wi-Fi wireless backhaul. The connected eNodeBs may interoperate with each other to form a wireless mesh network, which may be used for backhaul or for access. The connected base stations may communicate with each other and/or the coordinating node using the X2 protocol, Xx protocol, Xn protocol, or any other protocol, in some embodiments.

As the individual connected eNodeBs are situated very close to the UEs, they are therefore well-suited to performing scheduling of their individual communications, which requires that a scheduler provide scheduling information within the tight latency budget of 1 transport time interval (TTI), i.e., every 1 millisecond. However, by virtue of its position between the radio access network and the core network, the coordinating node is well-suited to communicating with other connected eNodeBs as well as any macro base stations with the X2 protocol. The coordinating node is thus able to achieve a more comprehensive view of the network, a "God's eye view," from which it is possible to identify optimizations across multiple base stations. These optimizations may be shared to the individual base stations within a latency budget in the tens of milliseconds, for example, roughly 20 milliseconds. These two types of optimization can be combined to produce a system in which two schedulers cooperate to provide improved interference cancellation.

In some embodiments, the coordinating node may send decision lists or messages that include a list of reservations and a list of restrictions. The list of reservations includes a list of resources that have been allocated to particular cell edge UEs. The list of restrictions includes a list of resources that have been interdicted or should be avoided. Each reservation may result in a corresponding restriction in a set of neighboring cells.

In some embodiments, a concept of overbooking may be provided. Cell edge UEs may be required to be allocated within resources or resource blocks assigned by the central scheduler. Other UEs may be assigned unallocated resources or resource blocks of a target UE, but the target UE may not be assigned resources outside of its specific allocation.

In some embodiments, the coordinating node may determine the order in which to perform allocations. Different orderings of base stations or UEs may result in different outcomes. In some cases, parallel or concurrent allocations may be performed; in some cases, sets of UEs and base stations may be created to partition the decision space. In some embodiments, random ordering may be used for UE or base station allocations.

In some embodiments, a macro cell may be treated differently than a small cell. In some embodiments, small cells may adapt to macro interference patterns.

In some embodiments, small cells may negotiate with each other to assign resources.

In some embodiments, certain parameters may be configured by a network operator, such as a maximum number of resource blocks per UE or a percentage of resources to be assigned to all cell edge users in aggregate.

In some embodiments, the coordinating node may pass these messages along and/or proxy them as necessary. In some embodiments, the coordinating node may be able to request measurement reports from one or more UEs. In some embodiments, since the coordinating node is in the data path, active flows may be sniffed to further improve interference mitigation and cancellation. Alternately, in some embodiments, the coordinating node may not make allocation decisions, and may instead provide a simpler function, namely, aggregate resource restriction lists from multiple cells and distribute the aggregated lists to the multiple cells.

In some embodiments, the coordinating node may perform some subset of the radio frequency chain (RF chain) processing of the base station. In some embodiments, any or all of the 3GPP 5G centralized unit (CU)/distributed unit (DU) functional splits may be permitted to be used, where the coordinating node performs the role of a CU and the base station performs the role of the DU. In some embodiments, these functional splits may be provided for 2G, 3G, 4G, and/or 5G RATs. In some embodiments, the flexibility of 5G numerologies and shorter TTI period can be supported or enabled by a suitably configured coordinating node and base station, such that, for example, the base stations may be configured to perform scheduling tasks requiring a certain latency and the coordinating nodes performing scheduling tasks requiring another latency. In some embodiments, a CU may be provided in conjunction with a coordinating node, providing multiple levels of coordination and centralized scheduling with different latency characteristics. 3GPP TR 38.801 14.0.0 is hereby incorporated by reference in its entirety.

Further information is provided regarding the coordinating node performing allocation decisions. In some embodiments, the coordinating node may run an algorithm and decide what is best for each base station, in some cases attempting to enable each base station to get a fair amount of throughput and/or ensure that its cell edge UEs get adequate throughput and delay performance. The coordinating node may also send back information guiding each base station, so that each base station can schedule at its node such that there may be less error rate and increased performance for the cell edge user. The coordinating node is in a good position to enable fairness across the entire network, for example, by ensuring that base stations are not penalized for their neighbors' interfering behavior by instructing the interfering base stations directly to reduce their power output. This is particularly important in a macro-femto deployment pattern of underlay coverage, where a macro cell and femto cell have overlapping coverage areas.

However, the base station itself has significant advantages in reacting to transient radio frequency interference. Base stations perform scheduling every 1 transport time interval (TTI), or every 1 millisecond according to the LTE standard. Having a scheduler on the base station allows all UEs to react within 1 TTI to any source of interference, without having to wait for a coordinating node to perform scheduling with a latency of, for example, 5-30 ms.

It follows that a decentralized architecture, where scheduling is divided between the base station and the centralized node, combines both advantages. The present disclosure explains how such a system may be realized with coordination between the base station and centralized node schedulers.

In some embodiments, the schedulers at the coordinating node and the individual connected eNodeBs communicate. These communications may be in the form of hints or scheduling instructions sent from the coordinating node to the individual eNodeBs. These communications may also be in the form of measurement reports received at the base stations and forwarded to the coordinating node, to allow the coordinating node to understand the radio environment from the perspective of the base station.

These communications can be sent using the X2 protocol, either using private information entities (IEs) or messages already defined in the protocol according to 3GPP TS 36.423 X2AP, hereby incorporated in its entirety by reference.

In some embodiments, up to four different types of communications are contemplated. First, a bitmap of one byte per downlink physical resource block (DL PRB) indicating an appropriate restriction level for each PRB can be sent from the coordinating node to the base stations, to instruct them not to use certain resource blocks. Values from 0 to 255 may be used to represent how much each PRB should be restricted.

Second, a corresponding bitmap for uplink PRBs (UL PRB) with one byte per UL PRB may be sent from the coordinating node.

Third, a per-UE interference indication message may be sent from each base station to the coordinating node. This message may be in a type-length-value (TLV) format, in some embodiments. The per-UE interference indication may include information such as the number of UEs connected to the base station (in the RRC Connected mode), the number of connected and active UEs, and additional information for each UE deemed to be at the cell edge, such as: an array of interferers, with evolved cell global identifiers (ECGIs) and interference levels; an array of cell quality indicators (CQIs) for each sub-band; an array of sounding reference symbol (SRS) signal-to-noise ratios (SINRs) for each sub-band; values indicating a required level of throughput for downlink, uplink, or both; a pair of values for required throughput for guaranteed bit rate (GBR) and non-GBR on uplink, downlink, or both; a UE priority; or other values.

Fourth, a message which may be in TLV format may be sent from the coordinating node to each base station with a list of resource blocks to avoid. These may be in the form of downlink and uplink resource block lists to avoid in bitmaps, or in the form of arrays of interference levels per block, with the base station to avoid blocks with high levels of interference, or in the form of a set of downlink and uplink resource block allocation bitmaps per UE, or system frame numbers (SFNs) corresponding to time slots to avoid, or some combination thereof. In some embodiments, the same restriction is pushed to all base stations in a particular set of base stations, called an interference zone. Interference zones may reduce communications overhead, as well as time required to compute the appropriate reservations and restrictions.

In some embodiments, UEs may be configured to send measurement reports to the coordinating node. Measurement reports are what enable the network to act responsively to interference. While only a base station can react quickly to interference within 1 TTI, the coordinating node may receive a continuously updated stream of measurement information that allows it to react to sources of interference within a relatively short time of, for example, 20-30 milliseconds.

In some embodiments, UE measurement reports may be configured using standard messages as defined in 3GPP TS 36.331, the LTE radio resource control protocol specification, hereby incorporated by reference in its entirety for all purposes. In some embodiments, UEs may be configured to send both periodic and event-triggered measurement reports, with event-triggered reports being requested whenever a neighbor cell becomes better than a defined threshold (type A4).

In some embodiments, scheduling information may be exchanged only for UEs deemed to be cell edge UEs. Cell edge UEs may be determined as follows. For each UE, if the reference signal received power (RSRP) of the UE's strongest neighbor is not greater than a minimum neighbor interference threshold, this UE is not a cell edge UE. If this value is greater than the threshold, the UE is a cell edge UE. Another radio quality metric may be used in place of RSRP, such as reference signal received quality (RSRQ), received signal strength indicator (RSSI), or signal to noise ratio (SINR), or a signal quality metric derived from one of these.

Once a cell edge UE is identified, its interferers are found. In UE measurement reports received from the base station, which may be periodic or event-triggered (A4) UE measurement reports, a neighbor-specific interference metric may be computed for each neighbor, starting with the strongest. This metric may be computed as (RSRP of neighbor A)/(RSRPserv). If this metric exceeds a minimum interference metric threshold, the neighbor is an interferer.

In operation, the coordinating node may be configured with one or more values, such as a maximum percentage of cell edge resources per base station (i.e., a percentage of all resources at a base station that may be used by the cell edge and not the cell center, which may affect the resilience of the base station under heavy interference conditions); a maximum percentage of cell edge resources that may be allocated to a single cell edge UE; and a periodicity for each full run of the coordinating node ICIC/FFR scheduler.

As the operation of the coordinating node ICIC/FFR scheduler depends on the reports sent by the base station, these reports are next described.

Reporting at the base station is handled as follows, in some embodiments. Each base station is configured to send configuration messages to attached UEs to request periodic neighbor measurement reporting, as well as A4 event-based measurement reporting, i.e., when a neighbor's signal becomes better than a threshold, as per 3GPP TS 36.331, hereby incorporated in its entirety, and in particular § 5.5.4.5).

In some embodiments, each base station is configured to send configuration messages to attached UEs to report CQI aperiodically. Aperiodic configured sub-band reporting may be performed for all UEs at intervals, for example every 60 seconds. By collecting CQI information for all sub-bands, downlink channel quality per sub-band is determined. From this information, CQI is computed per PRB by simply assigning the corresponding sub-band CQI to the CQI of the PRB.

In some embodiments, on the uplink, sounding reference signal (SRS) signal-to-noise ratio (SINR) is computed per physical resource block (PRB).

The base station may prepare an X2 message for the coordinating node. Each message may include a per-UE message element as described above. The per-UE message element may be computed as follows, in some embodiments.

First, for each interferer, quantize a neighbor-specific interference metric for the UE into N levels, e.g., Severe, High, Moderate & Low. This will find its way into the message field: Interference Level. Next, for each such UE, prepare the per sub-band CQI and SRS SINR array. To reduce processing burden at the coordinating node, the DL and UL per sub-band channel quality indications may be sorted, and the sorted array indices list may be sent to the coordinating node, which can now find the best PRBs to assign by traversing the sorted array indices list sequentially because the arrays are in order by available PRB. Finally, for each such UE, send the GBR (guaranteed bit rate) DL and UL throughput requirements.

The base station may collect the per-UE data whenever the reports occur, and the collected per-UE data shall be sent to the coordinating node periodically, such as once every 10 s. It is possible that in some 10 s periods, there are no UEs that had interferers. In such cases, there may be no reports sent. Note that all UEs report every minute. However, the coordinating node receives a bundle of UE reports at once. This provides a snapshot of the radio environment without the overhead of sending a message every time the base station receives a message. Messages received at the coordinating node may or may not expire, in some embodiments.

The reports received at the base station are summarized in a periodic reporting message sent to the coordinating node, with data on each UE and PRB, etc., as described above. Alternately, some or all of the reporting messages received from UEs may be sent to the coordinating node, in some embodiments.

The operation of the scheduler at the base station occurs as follows, in some embodiments. With the assistance of the coordinating node FFR/ICIC module, the base station scheduler may allocate frequency resources to UEs as follows.

(a) Cell edge UEs may be allocated resources from the list of resources earmarked for each UE, with cell edge UEs being scheduled before cell center UEs are scheduled in any given TTI. Among these earmarked resources, unutilized resources may be allocated to cell center UEs but not to cell edge UEs. These decisions may be received from the coordinating node. These procedures may be followed for both uplink and downlink.

(b) In both the DL and UL channels, cell center UEs may use any resources but must respect the resource restriction list bitmap sent from the coordinating node, in that the marked PRBs must be avoided or used with low transmit power. This may be controlled by the use of P_A, P_B parameters.

The scheduler may use various techniques to achieve lower power, such as closed loop power control; and the use of only QPSK modulation or 16-QAM modulation, based on interference level, for low-bitrate traffic such as VoIP, so that a low delta-tf is used in transmissions.

Figure 2:
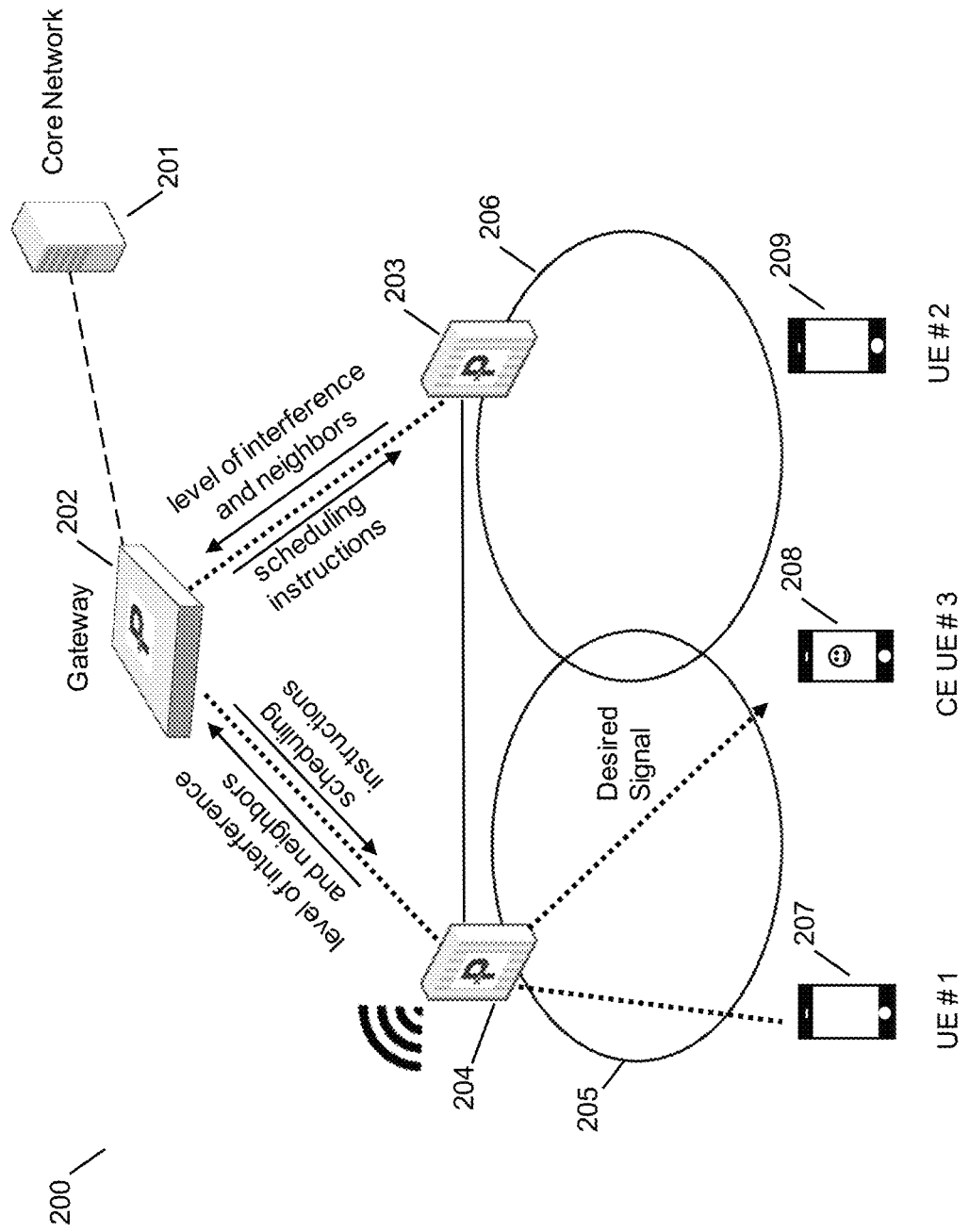
FIG. 2 is a schematic diagram of an exemplary radio access network topology, in accordance with some embodiments.

FIG. 2 shows an exemplary radio access network topology for a wireless network, in accordance with some embodiments. In diagram 200, UEs 207, 208, 209 connect to the radio access network via small cells 203 and 204. Small cell 204 has coverage area 205. Small cell 203 has coverage area 206. Small cells 203 and 204 are connected to gateway 202, which provides the small cells with coordination and also provides connectivity to core network 201. Small cell 204 is shown with a secondary wireless backhaul connection. Gateway 202 may be simultaneously providing radio access network (RAN) virtualization functionality toward core network 201. The radio access network includes several small cells that communicate their level of interference and neighbor reports to a coordinating node, which in turn sends scheduling instructions to the small cells. In some embodiments, a combination of macro cells and small cells, or a set of macro cells, could be used instead of small cells. As shown, UE 208 is a cell edge UE connected to cell 204. However, because it is in the cell edge, signal is not as good for UE 208 as it is for UE 207, and cell edge UE 208 may benefit from ICIC coordination with cell 203.

Figure 3:
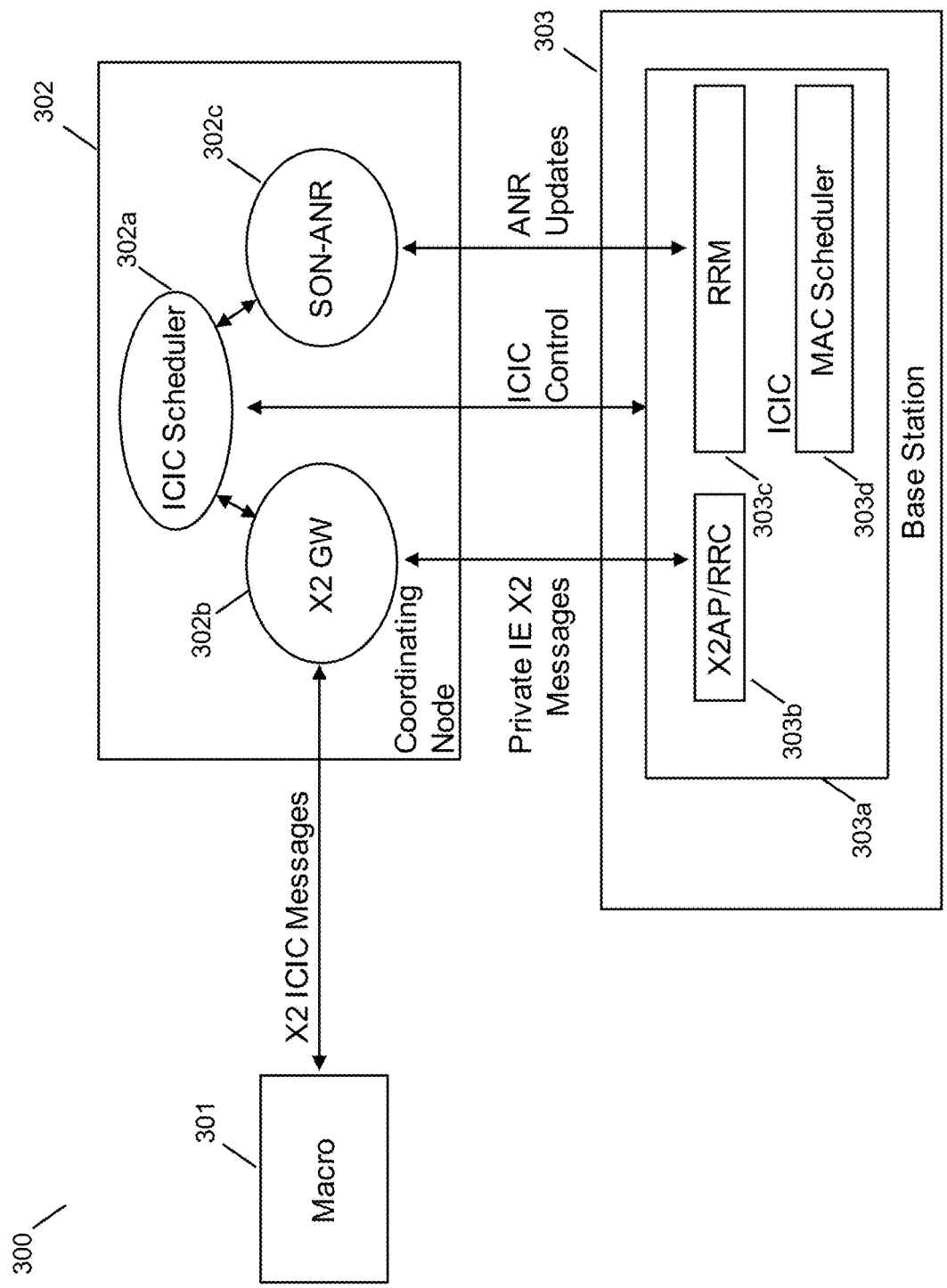
FIG. 3 is a system architecture diagram showing an interference coordination system, in accordance with some embodiments.

FIG. 3 is a system architecture diagram showing an interference coordination system, in accordance with some embodiments. FIG. 3 shows a communications flow between a macro cell, a coordinating node 302, and a base station 303. Macro cell 301 is also shown. X2 messages are used for exchanging information between the macro and the coordinating node, via X2 gateway 302b, and between the coordinating node and the small cell base station via X2 gateway 302b and X2AP/RRC module 303b. These messages may be private information element (IE) X2 messages, or standard X2 messages. Two schedulers, scheduler 302a on the coordinating node and scheduler 303d on the small cell base station, share information and provide decentralized scheduling of resources for UEs, while interoperating with the macro cell. ICIC scheduler 302a communicates ICIC control information to scheduler 303a. SON-ANR module 302 provides self-organizing network and automatic neighbor relations at module 302c, and may coordinate with radio resource manager 303c at the base station. Modules 302b, 302a, and 302c work in concert to provide up to date scheduling information at node 302. Scheduler 303a at the base station 303 may also include an ICIC media access control (MAC) scheduler module 303d, which may be used to send scheduling messages to UEs every TTI.

Details follow regarding design, architecture and message flow of dynamic ICIC for interference coordination. In some embodiments, CWS may refer to a Parallel Wireless Converged Wireless System multi-RAT base station; HNG may refer to a Parallel Wireless HetNet Gateway, which is a coordinating node between a radio access network and a core network that performs various additional functions; reporting period may be a time period between two successive reporting messages from a CWS, such as a ueIntfReportInd message; a scheduling period may be a time period at which successive messages are periodically sent from a HNG to a CWS, such as a IacSchDecisionReq message; an interference region may be a region of a cell where UEs attach to the cell experience interference from the same dominant interferer; CC UE may denote Cell Center UE; CE UE may denote Cell Edge UE; P1 may be a period of IacSchDecisionReq messages or a scheduling period; P2 may be a scheduling periodicity at CWS MAC that is the same as a transport time interval (TTI) (1 millisecond); RAT0 may denote Resource Allocation Type 0; TH1 may be a Cell Edge determination threshold; and TH2 may be a neighbor reporting threshold.

A specific example in accordance with some embodiments follows. While the following example is provided with reference to LTE technology, other technologies such as 3G or 5G would be able to be modified accordingly.

5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G is a term loosely connected to a current generation of a radio access network and core network, and includes both a 5G radio access network (RAN) and a 5G core network. The 5G RAN is designed to interoperate together with the 4G (Long Term Evolution or LTE) RAN and core network. The 5G core network is also designed to interoperate with the 4G core network. Deployment of the 5G RAN in conjunction with the 4G core network is known as "non-standalone" or NSA. Deployment of the 5G RAN with the 5G core network and without the 4G core network is known as "standalone" or SA. Various combinations of 5G, including standalone and non-standalone and with other radio access networks, are contemplated by the 3rd Generation Partnership Project (3GPP).

Noteworthy is that the 5G RAN contemplates the use of millimeter waves to provide additional bandwidth. Millimeter waves tend to have shorter range than microwaves, such that the cells are limited to smaller size. Millimeter wave antennas are smaller than the large antennas used in previous cellular networks. They are only a few inches (several centimeters) long.

Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device. References to a UE also include a 5G UE, references to an eNode B also include a gNodeB and references to a core network also include a 5G core network.

In some embodiments, the cell is divided into various Interference Regions based on the interference its UEs experience from its neighbors. UEs are Cell Center UEs by default. If the interference experienced by a UE exceeds threshold, TH1, then it is labeled a Cell Edge UE (CE UE). All CE UEs would experience interference from one or more neighbor CWSes. Only the dominant neighbor is considered as interfering neighbor to the UE for the purpose of identifying neighbors, in some embodiments.

Based on the dominant neighbor in periodic measurement reports received from all the UEs in period P1, the UEs are grouped into different interference groups, in some embodiments. All UEs having same dominant neighbor are said to belong to the same Interference Region.

Radio resource management (RRM) in CWS collates the UE measurement reports and sends the collated interference information of all CE UEs in M3 message to HNG. The HNG then groups the UEs into interference regions based on reported dominant interfere for each CE UE.

The CWS may also estimate and report the resource block (RB) requirements for each CE UE. This is reported by CWS for each CE UE to HNG as absolute number of RBs required by all established data bearers (DRBs) of the CE UE for next P1 period. The UE RB requirement estimation reports also go in M3 message to HNG.

HNG may use the reported RB requirements to assign resources to every Interference Region, in some embodiments. These allocations divide the available RBs to a cell across Cell Center and each of cell edge Regions thereby creating resource pools for each Interference Region. This is called cell resource partitioning. An example of simplified cell resource partitioning for two adjacent CWSes is shown in FIG. 4.

Figure 4:
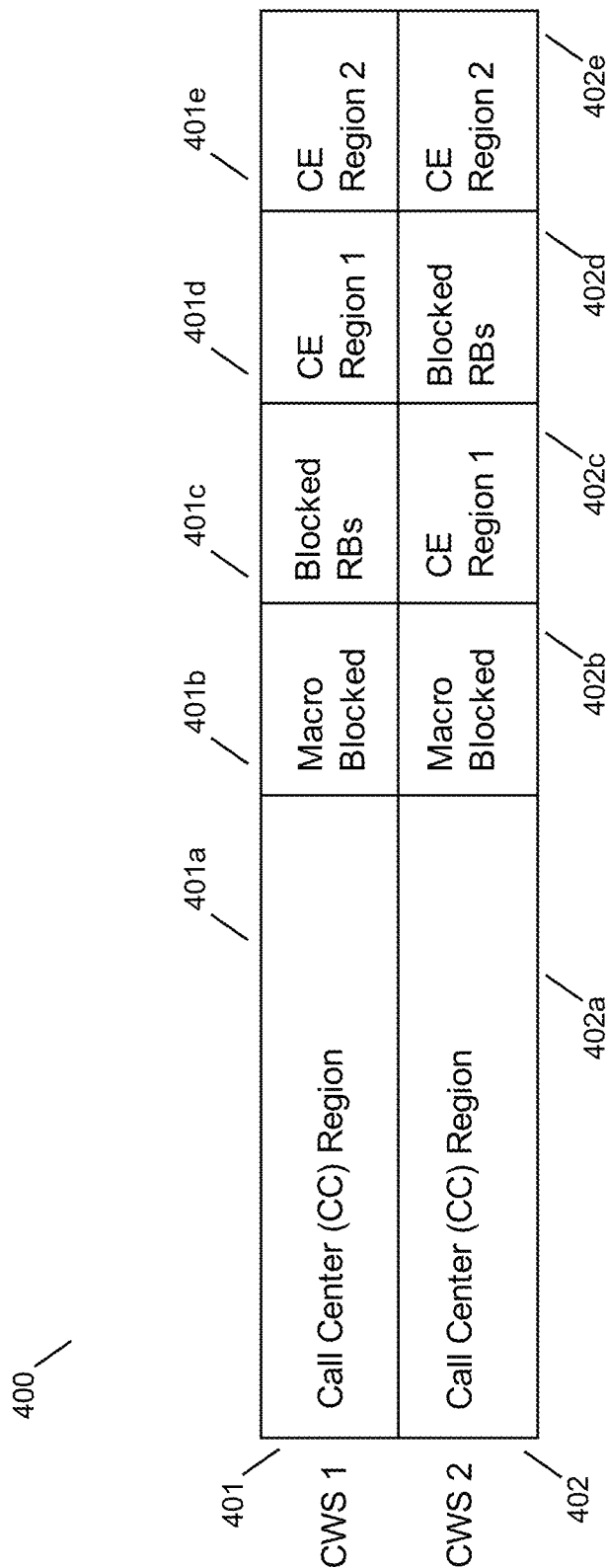
FIG. 4 is a schematic diagram of call edge and call center regions across two base stations, in accordance with some embodiments.

FIG. 4 is a schematic diagram of call edge and call center regions across two base stations, in accordance with some embodiments. CWS 1 has a coverage pattern shown conceptually in usage map 401. CWS 2 has a coverage pattern shown conceptually in usage map 402. Regions are stacked to show that they occur in the same frequency.

Various regions are marked either as blocked or as interfering. Regions 401b for CWS 1 and 402b for CWS 2 are in use by a macro cell that is in overlay configuration, so neither CWS 1 nor CWS 2 may use these resource blocks/frequencies. CWS 1 is transmitting in region 401c, marked as "blocked RBs." CWS 2 is transmitting in region 402d, marked as "Blocked RBs." CWS 1 and CWS 2 share an interference region "CE Region 1," 401d for CWS 1 and 4012c for CWS 2. These appear in different frequency bands because CWS 1's transmissions are not interference for itself, e.g., they interfere only with CWS 2 and vice versa. "CE Region 2" in each of them is an interference region caused by interference with other neighboring CWSes (separate neighbor for CWS 1 and CWS 2) not shown in FIG. 4. CWS1 shows CE Region 2 as 401e. CWS2 shows CE Region 2 as 402e. CWS 1 and CWS 2 may coordinate with a coordinating node, which has a view of both usage maps 401 and 402.

Figure 5:
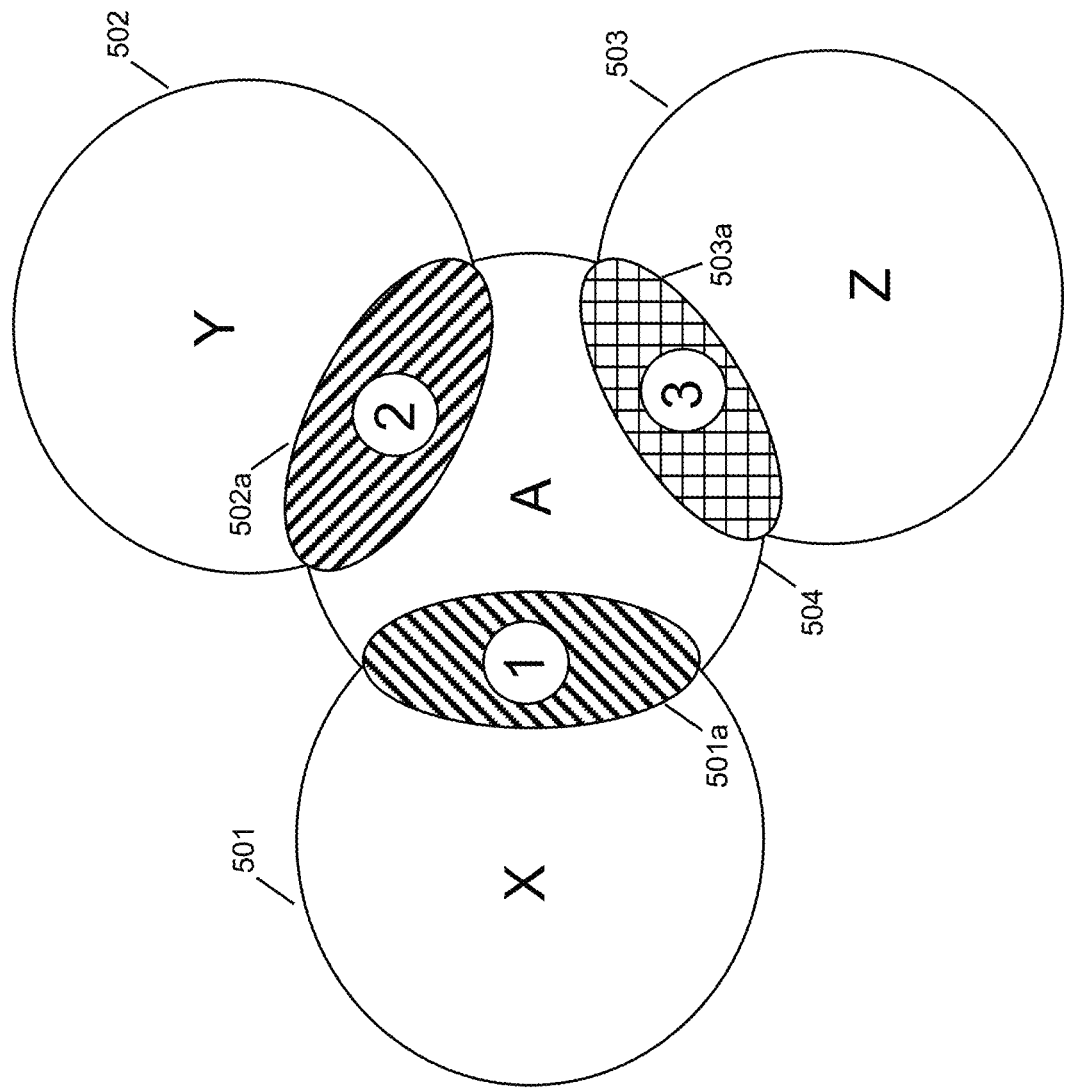
FIG. 5 is a schematic diagram of four base stations, in accordance with some embodiments.

FIG. 5 is a schematic diagram of four base stations, in accordance with some embodiments. CWS A 504, CWS X 501, CWS Y 502 and CWS Z 503 are shown. CWS A is the serving CWS and CWS X, CWS Y and CWS Z are the interferers. For UEs being served by CWS A, together they from three Interference Regions in CWS A: Interference Region 1 (IR1), between CWS A & CWS X, identified as 501a; Interference Region 2 (IR2), between CWS A & CWS Y and identified as 502a; and Interference Region 3 (IR3), between CWS A & CWS Z and identified as 503a. CWS X, CWS Y and CWS Z could have other interference regions with other neighboring CWSes not shown in FIG. 5.

UEs served by CWS A in IR1 would see CWS X as the dominant interferer. Similarly, UEs connected to CWS A in IR2 and IR3 would see CWS Y and CWS Z respectively as dominant interferer. The resources allocated to CWS A in IR1 (RA1) may be blocked in CWS X. Similarly resources allocated to CWS A in IR2 (RA2) and IR3 (RA3) may be blocked in CWS Y and CWS Z respectively. RA1 can be used by CWS Y and CWS Z, RA2 can be used by CWS X and CWS Z and RA3 can be used by CWS X and CWS Y.

Resource recovery from CE Interference Regions. Since the UEs that can be scheduled in a TTI are bounded by max scheduled UEs per TTI supported by the solution we may find that in certain TTIs there are no UEs scheduled from certain CE Interference Regions. The resources allocated to such unused CE Interference Regions would go waste in these TTIs. Same is also true for partially utilized resources of CE Interference Regions in a TTI. To avoid wastage of resources MAC scheduler may employ the following resource recovery mechanism, in some embodiments.

In a TTI CE UEs are allocated resources prior to CC UEs. The resources allocated to unused CE Interference Region pools are allocated to CC Interference Region pool of the cell for use by CC UEs. The unused resources from partially used CE Interference Region pools are also allocated to CC Interference Region pool of the cell for use by CC UEs. This does not pose interference to neighbor cell CE UEs since the resources used by neighbor cell CE region UEs are not allocated by HNG for use to any region in serving cell.

As a follow-up to ICIC Phase2, the resources allocated to neighbor cell CE Interference Regions may be used as low power transmission resources in serving cell. This may be achieved by appropriately modifying the settings of pA in PDSCH-ConfigCommon & pB in PDSCH-ConfigDedicated for serving cell.

Figure 6:
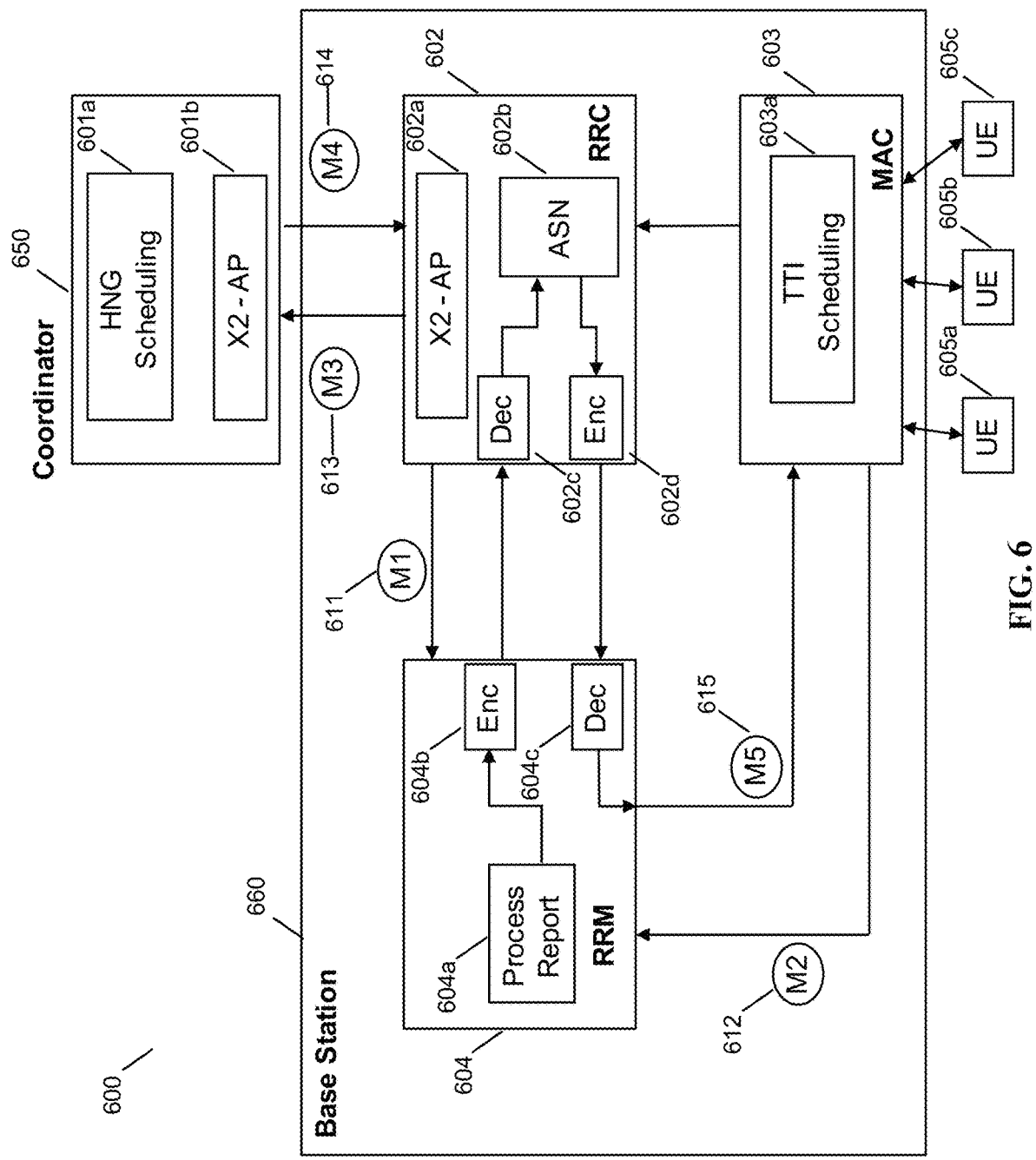
FIG. 6 is a further system architecture diagram showing an interference coordination system, in accordance with some embodiments.

FIG. 6 is a further system architecture diagram showing an interference coordination system, in accordance with some embodiments. Diagram 600 shows the block diagram, interfaces and message flow across various CWS modules for dynamic ICIC scheme. Coordinator 650 is a coordinating node or HNG. Base station 660 is a base station or CWS. Coordinator 650 includes HNG scheduler 601a and X2AP module 601b (for communicating with CWS as below). Base station (CWS) 660 includes an RRM module 604, an RRC module 602, and a MAC module 603. Base station 660 is providing access to UEs 605a, 605b, 605c.

Base station 660 receives messages from coordinator 650's X2AP module 601b. These messages are received at RRC 602 by X2AP module 602a, and passed to RRM 604. RRC also includes encoding 602d and decoding 602c modules, and ASN module 602b. RRM 604 includes process report module 604a, and encoding module 604b and decoding module 604c. MAC 603 includes TTI scheduling module 603a.

Certain messages are used in some embodiments, as defined below.

M1 (611)—Periodic measurement reports from UEs (ueMeasReportInd). From UE to CWS (RRC) and further in CWS from RRC to RRM. Contains interfering neighbors' identities and interference RSRP.

M2 (612)—UE resource requirement report (ueResourceReqInd). From MAC to RRM. Contains CE UE resource estimates.

M3 (613)—UE Interference Report (ueIntfReportInd). From CWS to HNG. Contains interfering neighbors' identities, interference level and resource requirement estimates for CE UEs.

M4 (614)—HNG scheduling decision message (IacSchDecisionReq). From HNG to CWS. Contains Interference Region list, UE ids within each region and resource allocation to each Interference Region (frequency resource partitioning).

M5 (615)—RRM MAC Scheduling decision message (rrmSchDecisionReq). From RRM to MAC. Same content as M4.

Message sequence. The sequence of steps for execution of dynamic ICIC scheme in some embodiments is described below.

Step 1—Periodic measurement reporting is configured for all UEs in serving cell.

Step 2—MAC computes and periodically sends CE UE resource requirement estimates to RRM in message M2 with periodicity P1.

Step 3—RRM receives, continuously: a. UE measurement reports from RRC which contain information about interfering neighbors experienced by each UE and the interference level of each DL interferer in message M1; and b. CE UE resource requirement estimates from MAC in message M2.

Step 4—On arrival of M2 message from MAC, RRM creates the message M3 and sends it to RRC for further transmission to HNG.

Step 5—At RRC message M3 is ASN processed and sent to HNG through X2-AP. This is sent with same periodicity P1.

Step 6—UE reports from RRM are collated by HNG and HNG scheduling algorithm is executed.

Step 7—HNG forms message M4 and sends it to CWS (RRC) for transmission to RRM. This is sent with periodicity P1.

Step 8—Message M4 is ASN decoded by RRC and sent to RRM. This is sent with periodicity P1.

Step 9—RRM communicates the resource partitioning information to MAC through message M5. This is sent with periodicity P1.

Step 10—MAC uses this resource partitioning information communicated by RRM and carries out per TTI scheduling. Periodicity P2 (per TTI, 1 ms).

Various parameters may be configurable at the coordinating node, including, for example in some embodiments, a maximum number of cell edge UEs, per TTI or per CE region per TTI; a periodicity of ueIntfReportInd reports or lacSchDecisionReq messages; a CE decision threshold TH1; a neighbor reporting threshold TH2; a neighbor RSRP quantization threshold (high, medium, low).

Other parameters may be configurable at the base station, such as the periodicity of various messages or periodicity of ueResourceReqInd.

UE Location Determination

In some embodiments, two UE location variables are maintained for every UE in its state data structure: ueLocation: determined and updated by RRM based on neighbor reports as explained in (3) below; for all UEs determined as CE UE based on this criteria CWS reports their resource requirements estimates to HNG; and ueIntfRegion: updated based on assignment of UE to one of Interference Regions by HNG in lacSchDecisionReq message, which is used to identify the resource pool from which to allocate the resources to this UE.

For the purpose of reporting resource estimates to HNG the UEs may be identified as belonging to the cell center or the cell edge. The UE location in (2) is computed (in CWS) and recorded in RRM and communicated to MAC. ueLocation of a UE is set to CE_REGION if, in some embodiments, serving RSRP−Dominant Interferer RSRP<=TH1.

For the purpose of resource allocation, the UEs are allocated resources from the Interference Region to which they are assigned to (stored in ueIntfRegion) by HNG in lacSchDecisionReq message, in some embodiments.

In some embodiments, if a UE is not assigned to any Interference Region by HNG during a scheduling period, it may be allocated resources from cell center resource pool for that scheduling period, immaterial of actual location of UE as determined in (3) above.

On movement of UE from CC to CE region, during on-going HNG scheduling period ueLocation is assigned CE_REGION while ueIntfRegion continues to be PW_C-C_REGION region. After arrival of next lacSchDecisionReq message the ueIntfRegion is updated as described in (4) and (5) above, in some embodiments.

On movement of UE from CE to CC region, both ueLocation and ueIntfRegion are updated to CC_REGION and PW_CC_REGION respectively and take effect from next TTI execution, in some embodiments.

In some embodiments, a UEInterference report is prepared as follows: 1. Listing of all neighbors reported by CE UEs is populated into ueIntfReportInd message if—Serving_RSRP−Neighbor_RSRP<=TH2; 2. all valid neighbors are assumed to be already present in ANR table of CWS; 3. Neighbor identification details (PLMN_ID and CELL_ID) are picked from ANR table for populating into ueIntfReportInd message; 4. Neighbor entries not present in ANR table are not reported by CWS; 5. Only UEs which are determined to be CE UEs based on criteria in (1) have their resource estimates reported to HNG in ueIntfReportInd message.

UE Neighbor Determination

In some embodiments, periodic measurement reports from UEs are used to determine interfering neighbors to UEs. The measurement reports from UEs are processed by RRM to determine an identity of interfering neighbor—PLMN_ID (MNC and MCC) and CELL_ID; and an interference level experienced by the reporting UE i.e. RSRP from interfering neighbor. RRM may quantize the RSRP of interfering neighbor into following three levels before reporting it to HNG—HIGH, MEDIUM, or LOW.

Resource Requirement Estimation for UEs

In some embodiments, both GBR and Non-GBR RB requirements may be reported for every CE UE. The reported RB requirement may be the absolute number of RBs required by the UE (GBR and Non-GBR separately) for next scheduling period P1. The RB requirement is reported considering only one Layer in use by UE. For GBR bearers the allocated GBR bit rate (kbps) cumulatively for all GBR bearers may be used to report the GBR-RB requirement for a UE. For Non-GBR bearers the requirement is assumed same as the amount of data UE expects to transmit (uplink)/receive (downlink) during a reporting period (P1). This means the average input bit rate at Layer2 (of UE for uplink and of CWS for downlink) from network/application may define the resource requirement from UE.

Downlink Average Byte Requirement Estimation

In some embodiments, downlink may be treated the same as SDU arrival bit rate at PDCP. A running counter may be used to track the downlink queue load at RLC. Whenever a SDU is queued up at RLC downlink queues its data size gets added up into the running counter, e.g., cumulative_dl_queue_load_per_ue+=new_dl_data_size (in bytes) and duration_of_accumulation=N (in milliseconds), in some embodiments.

In some embodiments, to project the requirement for next N milliseconds (TTIs) the requirement may be calculated for last M windows of size N milliseconds each. The requirement for next N milliseconds may be a running average of last M windows of duration N milliseconds each.

Uplink Average Byte Requirement Estimation

In some embodiments, for uplink BSR from UE may be used to calculate the average uplink bit rate available at UE. BSR denotes the instantaneous data queue depth at UE. To calculate uplink average bit rate the following procedure may be followed: 1. BSR reports from UE are tracked; 2. Every new BSR will over write existing BSR; 3. Existing BSR will be updated (decremented) with every UL allocation to UE; and 4. New UL data arrived at UE will be calculated (as below) on the TTI when BSR is received from UE. An algorithm for this follows.

```
if(ul_grant_allocated_for_ue)
    existing_bsr -= ul_grant; //reduce_existing_bsr by
                                grant allocated
    if (bsr_arrived)
        new_bsr = arrived_bsr; //update new_bsr;
    else
        new_bsr = 0;
```

```
    if (new_bsr > existing_bsr)
        new_ul_data_size = new_bsr - existing_bsr;
    else
        new_ul_data_size = 0;
    cumulative_ul_queue_load_per_ue += new_ul_data_size;
    //bytes
    duration_of_accumulation = N; //milliseconds
```

Similar to downlink, to project the requirement for next N milliseconds (TTIs) the requirement may, in some embodiments, be calculated for last M windows of size N milliseconds each. The requirement for next N milliseconds 8 be a running average of last M windows of duration N milliseconds each.

Byte Requirement to Resource Block Conversion

In some embodiments, this conversion may be done using existing mechanism available at MAC. One or more of following variables may be used to compute the RB requirement from absolute byte requirement computed above: CQI; absolute byte requirement; and Transmission Layers used by UE (may be assumed to be 1)

Initialization

In some embodiments, arrival of every lacSchDecisionReq request message triggers an initialization sequence. This means the initialization happens periodically with the periodicity of lacSchDecisionReq message arrival.

After the lacSchDecisionReq message is received the initialization functions populate the MAC data structures with new partitioning info for RAT0 policy [3]. The RB allocation for each region is converted into RBG allocation. To avoid overlaps between regions, the partially allocated RBG are dropped from allocation to the region.

The allocation bitmaps are created for each region, 1 CC and up to 6 CE regions. Finally CC region is allocated the bitmaps from all the CE regions as well.

Since MAC scheduler now allocates the resources for UEs from the interference region pool they are assigned to, all the UEs who are not associated to any interference region in this lacSchDecisionReq message have their interference regions reset to PW_CC_REGION so that they can get resources from CC interference resource pool. This is done by resetting the ueIntfRegion of all unassigned UEs to PW_CC_REGION region as a part of this initialization sequence.

MAC Scheduler Resource Allocation Strategy

In some embodiments, the UEs are picked in accordance with round robin scheduling policy. Once a UE is picked it is allocated resources from the interference region pool to which it belongs based on its location e.g. if the UE picked is a CC UE it 8 get allocation from CC interference resource pool while if the UE picked is a CE UE it 8 get allocation from the CE interference resource pools to which it belongs.

In some embodiments, this strategy may follow the bounds of allocating following maximum limits in terms of UEs being scheduled: No more than maxUEperTTI 8 be scheduled in all in a TTI; and no more than maxUEsInaRegion 8 be scheduled from a region, in a TTI, while scheduling the UEs.

In some embodiments, in case (2) the UE gets dropped and next UE in the round robin list gets scheduled in its place again following the two constrains (1) and (2). This dropped UE gets added to a priority queue. During next scheduling opportunity the UEs from this priority queue are picked before processing the regular round robin queue.

MAC Scheduler Resource Allocation

In some embodiments, based on the RBG count allocated by strategy to a UE the allocator 8 pick the RBGs from the pool to which it belongs and removes (resets) the allocated bits from its bitmask in sequential order, in some embodiments.

The periodic behavior of messages and execution at CWS is described with reference to FIG. 7.

Figure 7:
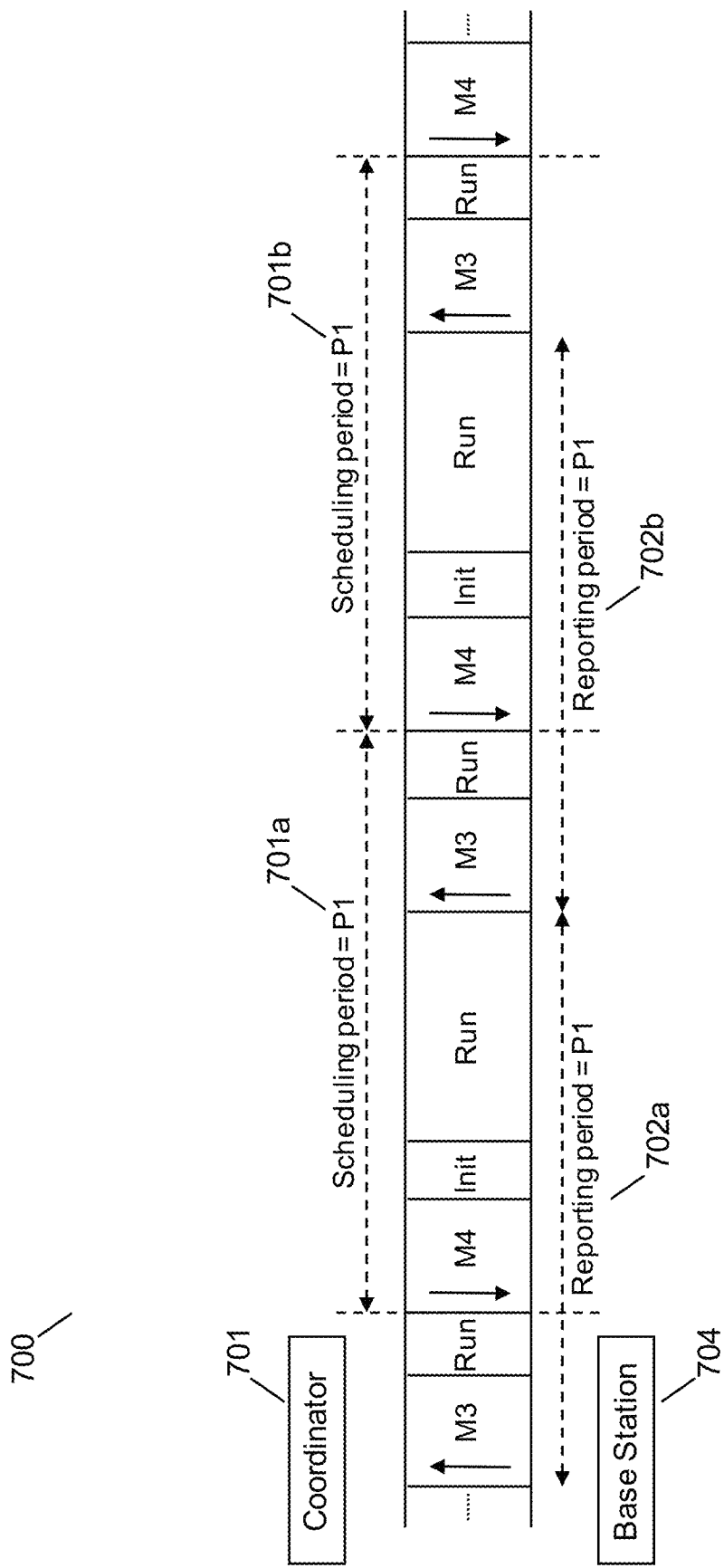
FIG. 7 is a schematic diagram showing time periods in operation of a scheduling process, in accordance with some embodiments.

FIG. 7 is a schematic diagram showing time periods in operation of a scheduling process, in accordance with some embodiments. The diagram may be thought of as a vertically-oriented message flow diagram, where messages are passed to and from the coordinating node 701 to the base station 704, with directionality shown as arrows. The message-passing periods are broken up as follows, with the following meanings for the legends in the diagram:

M3: ueIntfReportInd message from base station to coordinating node

M4: lacSchDecisionReq message from coordinating node to base station

P1: M3 periodicity currently same as M4 periodicity

Init: initialization sequence as described herein

Run: Per TTI execution of MAC scheduler using partitioning information received in M4.

In operation, in some embodiments: 1. Base station reports message M3 to coordinating node at periodicities of P1, tightly defined by TTI counter. 2. During ongoing scheduling period, P1, coordinating node 701 receives M3 from all base stations. It then executes the scheduling algorithm and sends message M4 to all the base stations. This contains the resource partitioning info for the base station. 3. On receiving M3, base station executes a resource initialization sequence with newly received partitioning information. 4. This information is then used for per TTI scheduling at base station (MAC) until the arrival of next M4 from the coordinating node.

A complete cycle involves, from the point of view of the coordinating node: receiving message M3 at the coordinating node; executing the scheduling algorithm; sending a message M4 to the base station; initialization sequence; and the base station executing MAC scheduling. From the point of view of the coordinating node 701a, scheduling is performed for a scheduling period P1 shown as 701a and 701b. From the point of view of the base station 704, its responsibility is reporting during reporting period P1, shown as 702a and 702b, as well as scheduling based on messages received from the coordinating node.

Periodic Behaviour at CWS

Partitioning of cell resources is done independently for downlink and uplink cell resources, in some embodiments. This resource partitioning information is communicated by HNG to CWSes in message M4. This partitioning is valid on the CWS receiving it for every TTI for next period P1 or until next M4 message is received. Thus this scheme does resource allocation hierarchically across HNG and CWS with two periodicities P1 and P2 (TTI).

1. Resource distribution at periodicities of P1 is done by HNG. This distributes each cell resources across different Interference Regions of the cell and is updated every P1 period.
2. Within P1 period the resources are distributed every TTI to the UEs from their respective Interference Region pools in a cell. This is done by MAC scheduler on CWS and is carried out on TTI to TTI basis.

In some embodiments, an expiry period of partitioning information received in last lacSchDecisionReq message can be used beyond which the last partitioning received from coordinating node would not be valid on base station.

Computation and report of UE priority may be by base station priority, or static UE priority. Static or dynamic ICIC configuration on CWS may be controlled by configuration message from coordinating node.

The operation of the coordinating node scheduler is next described in relation to some embodiments. An algorithm may be executed with the following steps, as shown in relation to FIG. 8.

Figure 8:
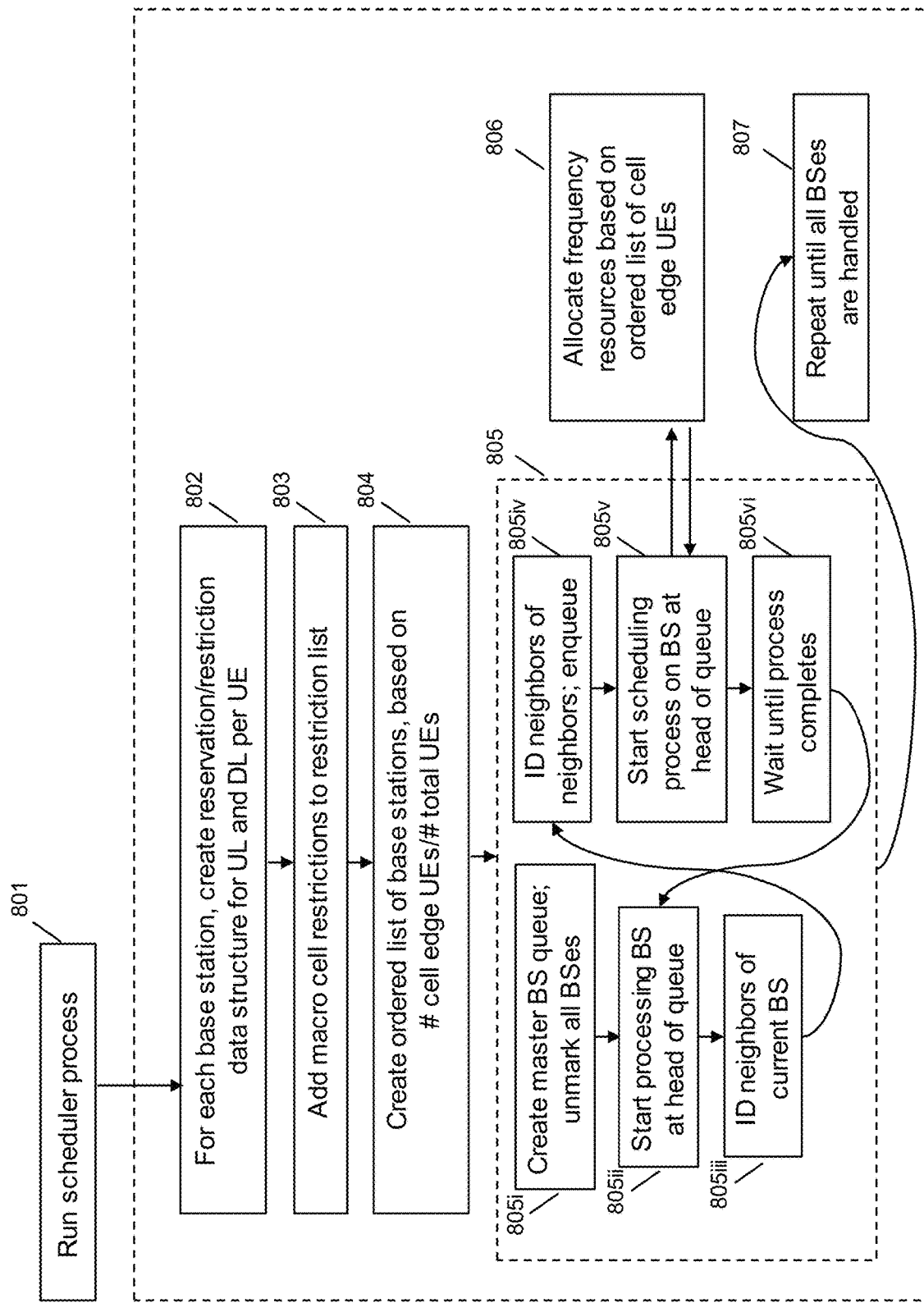
FIG. 8 is a flowchart of frequency allocation, in accordance with some embodiments.

FIG. 8 is a flowchart of frequency allocation, in accordance with some embodiments. At step 801, the coordinating node runs steps 802-207 once every configured period.

At step 802, for each base station, the coordinating node creates a data structure for UL and DL, containing cell edge allocations per UE (reservations) and resources to avoid (restrictions).

At step 803, assuming a master-slave relationship with the macro, the coordinating node adds the superset of macro restrictions to the "resources to avoid" list. Macro restrictions are conveyed through the HII and RNTP IEs of the X2 protocol Load Indication Message for UL and DL, respectively.

At step 804, the coordinating node creates an ordered list of base stations based on the criterion: # of Cell Edge UEs/# of Total UEs. The base station chosen first has an advantage in picking resources over the next. Hence randomizing the selection of the first base station may be performed in order to make the system fairer.

At step 805, the coordinating node picks the first unprocessed base station from the list, and launches concurrent processes for independent clusters where clusters are defined as follows. If a base station is picked, the collection of its neighbor and neighbor's neighbor constitutes a cluster. The definition of a cluster containing a base station can be generally thought of as comprising all base stations within a specified geographic distance and/or within a specified RF path loss of said base station. The algorithm can be run concurrently for each cluster. However, at the boundary of a cluster, ensure that the algorithm does not work on immediate neighbors at the same time. This is just a matter of synchronization.

In other words, 805(*i*) create a master base station list and mark all base stations incomplete; 805(*ii*) pick the first unprocessed base station from a list and start a process, tracking the process in a process list; 805(*iii*) identify its neighbors in the cluster; 805(*iv*) for each of the neighbors in the cluster, identify its neighbors, in a depth-first search manner, and add them to the list; 805(*v*) start a scheduling process on the head of the queue unless one of its neighbors is currently being processed in the process list; 805(*vi*) return to (ii) and continue until all base stations have been processed, after which go back to (i).

At step 806, for the chosen base station, starting with the ordered list (ordered based on UE priority marked by the base station) of cell edge UEs, allocate best fit DL frequency resources based on sub-band CQI and best fit UL resources based on SRS SINR. Best fit resources must satisfy the GBR requirements of each UE. It is acceptable to over-allocate resources, since unused resources 8 be reused by the cell center UEs. Resource Allocation Types possible in LTE may also be taken into account for optimum usage or resources, as described in 3GPP TS 36.213. Resource Allocation Types may also be used in conjunction with or to facilitate the creation of interference zones. An interference zone is a set of base stations, to each of which the same set of restrictions should be pushed. The interference zone results in simplified processing and reduced signaling.

Additionally, during allocation, we need to take into account restrictions marked for chosen base station by the algorithm that may have run in neighbor cells. Restrictions are handled, in some embodiments, by mapping restriction level to a SINR dB penalty. In the DL channel, CQI is converted to equivalent SINR, the penalty is applied, and the parameter is reconverted to CQI. In the UL channel, the penalty is applied directly to SRS SINR for the applicable sub-band.

In the base station's coordinating node interface message, the neighbors are also listed. The allocated resources are marked as restricted for each neighbor's "resources to avoid" list.

Thus, in the chosen base station, resource allocations for cell edge UEs are marked and the corresponding resources are marked for avoidance in the relevant neighbors. In other words, once a base station is picked for FFR scheduling, the coordinating node makes specific reservations for each cell edge UE in said base station and restrictions on usage of resources in neighboring base stations such that the reserved allocations have only manageable interference power.

After this process is complete for the base station, the time for application of the decisions in SFN-SF (system frame number—selected frame) may be indicated and passed to the base stations. This is to synchronize the application of decisions across all base stations.

At step 807, the coordinating node repeats steps 805 and 806 until all base stations are handled in each cluster. This whole-network minimization analysis may be repeated approximately once per minute, or per configurable interval. Both most-recent and historical measurement reports may be integrated; in some embodiments, measurement reports may be retained without ageing out of the analysis set.

Various refinements and variations of this scheme are also contemplated. For example, cell edge UEs may be identified by eNodeBs without the help of the coordinating node, using the same method, in some embodiments. In some embodiments, a minimum number of UEs may be required to start performing the fractional frequency reuse (FFR) procedure. In some embodiments, 4 UEs per TTI may be required. In some embodiments, UEs may be configured such that discontinuous reception (DRX) mode is enabled and configured to report, in connected mode, ECGI of interfering neighbors. In some embodiments, selective scheduling of DL or UL frequencies may be enabled, which may be based on periodic UE-selected sub-band CQI reporting.

In some embodiments, a downlink control indicator (DCI) downlink packet data unit (DL PDU) transmission power offset may be set to enable soft frequency reuse (SFR). In some embodiments, sounding reference signal (SRS)-based SINR reporting may be used for frequency selective scheduling.

In some embodiments, X2 resource status reporting initiation (RSRI) messages may be used to request the information described herein, and various X2 status reporting messages may be used, as described by 3GPP TS 36.423, hereby incorporated in its entirety, or other messages. In some embodiments, additional X2 information elements (IEs) may be used, including private IEs. Handshaking may be used to establish X2 communications between each communicating node, for example to identify a supported private X2 protocol version, in some embodiments. Verification of ASN (ITU-T Recommendation X.680, "Information Technology—Abstract Syntax Notation One (ASN.1): Specification of basic notation"; see also ISO/IEC 8824-1) encoding/decoding of private IE in a 3rd party ASN encoder/decoder may also be enabled, in some embodiments.

In some embodiments, the same architecture could be used with installations that use the common public radio interface (CPRI) to separate radio heads from their processing units at the base station. Individual base stations may have radio heads separated by a few meters or tens of meters from their baseband processing units, with the radio interface connected to the baseband unit by fiber optic or copper Ethernet connections according to the CPRI protocol and specification. No change is required in the disclosed systems or methods. Any 3GPP functional split could be supported, in some embodiments. As LTE requires processing to be performed within the 1 ms TTI budget, all processes described herein for the femto base station may be performed on a remote radio head (RRH) with a CPRI connection with <1 ms latency. Further, as the distributed scheduler described herein is broken up into two (or more) portions, the base station scheduler is allowed the benefit of a remote cloud scheduler with greater (i.e., ~20 ms) latency without requiring <1 ms latency for the cloud scheduler.

In some embodiments, a femto cell eNodeB may check whether the affected UEs can be switched to a different radio access technology (RAT), such as Wi-Fi. As Wi-Fi has different characteristics, the check may include determining whether the desired spectral band is available, and may also include determining whether the UE is within Wi-Fi range, which may be less than the range of the LTE protocol air interface. A soft handoff may be performed between the LTE and Wi-Fi interfaces. Wi-Fi may be used as a last resort in the case that interference is above a maximum permitted threshold. Wi-Fi may also be used in the case that other interference mitigation attempts are not successful. A switch to Wi-Fi may be performed in connection with each of the below scenarios as well, in some embodiments.

In some embodiments, the femto cell eNodeB may check whether the victim UE can be switched to a different RAT, such as Wi-Fi.

In some embodiments, an X2/Xx/Xn protocol-based coordination scheme may be used to coordinate between multiple cells and also between each cell and the central scheduler.

In some embodiments, sniffing may be used to assess available uplink resources. The sniffing base station may listen on a plurality of radio frequencies to determine how each radio resource is used. For each radio resource, the sniffing base station may receive signals broadcast on that resource, and may then calculate power spectral density for each band. The calculation of power spectral density may be over a short time period, such as over 1 TTI, or less than 1 TTI. The calculation of power spectral density may be performed at a digital signal processor (DSP). In other embodiments, sniffing may be used to assess available downlink resources.

In some embodiments, the transmit power for each UE may be dynamically adjusted based on one or more parameters, such as measured interference, signal strength of other base station nodes, or other parameters. Transmit power may be adjusted based on signals received at more than one base station, including femto cell base stations and macro cell base stations, in some embodiments. Transmit power may be adjusted based on communications with a cloud coordination server, which may coordinate interference and signal strength reports from multiple base stations, in some embodiments.

In some embodiments, where the word eNodeB is used in the present disclosure, a multi-RAT node or a single-RAT node supporting one or more of 2G, 3G, 4G, and 5G may be substituted with no loss of generality.

Figure 9:
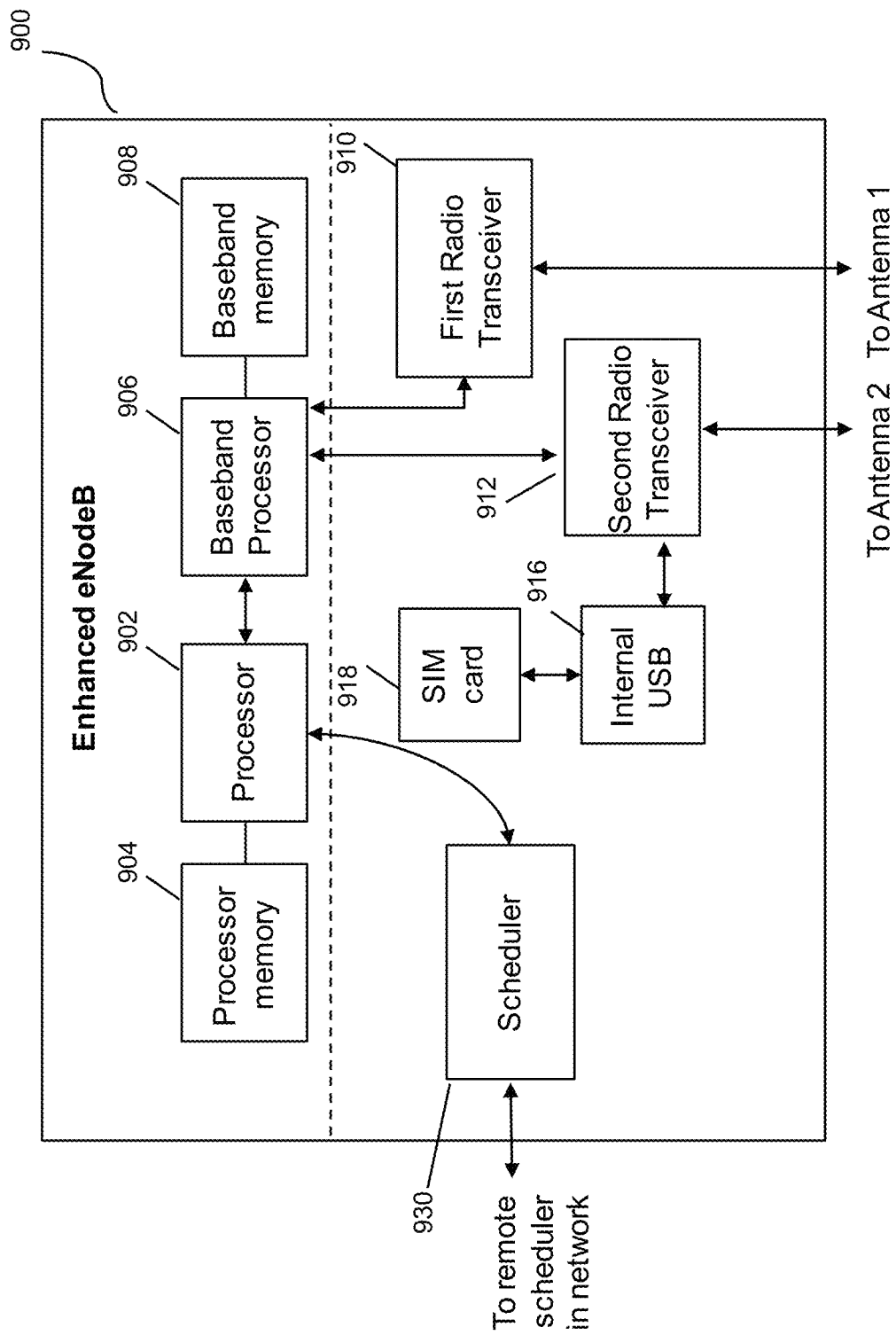
FIG. 9 is a schematic diagram of an enhanced eNodeB, in accordance with some embodiments.

FIG. 9 is a schematic diagram of an enhanced eNodeB, in accordance with some embodiments. Enhanced eNodeB 900 may include processor 902, processor memory 904 in communication with the processor, baseband processor 906, and baseband processor memory 908 in communication with the baseband processor. Enhanced eNodeB 900 may also include first radio transceiver 910 and second radio transceiver 912, each being able to provide one carrier, such as a 3G or LTE FDD or TDD carrier, or alternatively Wi-Fi; internal universal serial bus (USB) port 916, and subscriber information module card (SIM card) 918 coupled to USB port 916. In some embodiments, the second radio transceiver 912 itself may be coupled to USB port 916, and communications from the baseband processor may be passed through USB port 916. Second radio transceiver 912 may be a backhaul UE modem used for providing backhaul connectivity to users connected to first radio transceiver 910.

Processor 902 and baseband processor 906 are in communication with one another. Processor 902 may perform routing functions, and may determine if/when a switch in network configuration is needed. Baseband processor 906 may generate and receive radio signals for both radio transceivers 910 and 912, based on instructions from processor 902. In some embodiments, processors 902 and 906 may be on the same physical logic board. In other embodiments, they may be on separate logic boards.

Processor 902 may also be coupled to scheduler 930, which provides scheduling according to the present disclosure for the first radio transceiver 910, or for the second radio transceiver 912 or both radio transceivers. Scheduler 930 may be in communication with a remote scheduler, such as the coordinating node scheduler described in various places herein. The remote scheduler is located in the network, for example at a boundary between the core network and the radio access network, and therefore although an arrow is shown, connectivity to the remote scheduler may be provided via the backhaul connection, such as via second radio transceiver 912.

The first radio transceiver 910 may be a radio transceiver capable of providing LTE eNodeB functionality, and may be capable of higher power and multi-channel OFDMA. The second radio transceiver 912 may be a radio transceiver capable of providing LTE UE functionality. Transceivers 910 and 912 may be capable of receiving and transmitting on one or more LTE bands. In some embodiments, either or both of transceivers 910 and 912 may be capable of providing both LTE eNodeB and LTE UE functionality. Transceiver 910 may be coupled to processor 902 via a Peripheral Component Interconnect-Express (PCI-E) bus, and/or via a daughtercard. As transceiver 912 is for providing LTE UE functionality, in effect emulating a user equipment, it may be connected via the same or different PCI-E bus, or by a USB bus, and may also be coupled to SIM card 918.

SIM card 918 may provide information required for authenticating the simulated UE to the evolved packet core (EPC). When no access to an operator EPC is available, local EPC 920 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 910 and 912, which may be Wi-Fi 802.11a/b/g/n/ac/ad/ah, Bluetooth, ZigBee, microwave (including line-of-sight microwave), 5G, TVWS, or another wireless backhaul connection. Any of the wired and wireless connections may be used for either access or backhaul, according to identified network conditions and needs, and may be under the control of processor 902 for reconfiguration.

Other elements and/or modules may also be included, such as a home eNodeB, a local gateway (LGW), a signaling reduction module, or another module. Additional radio amplifiers, radio transceivers and/or wired network connections may also be included. A wired network connection, such as optical fiber or Ethernet, may provide backhaul to the core network, in some embodiments.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 910 and 912. Baseband processor 906 may use memory 908 to perform these tasks.

Figure 10:
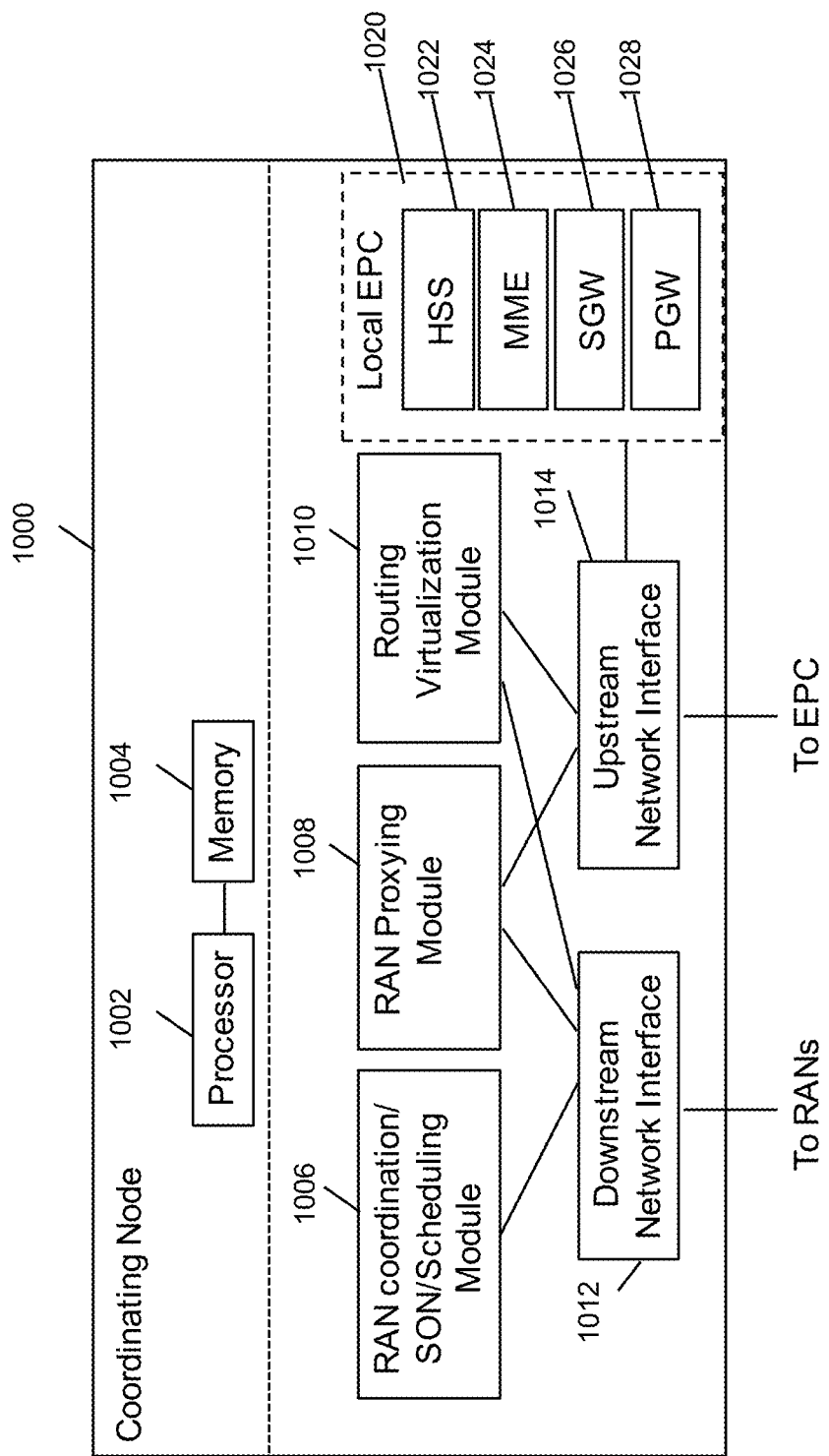
FIG. 10 is a schematic diagram of a coordinating node, in accordance with some embodiments.

FIG. 10 is a schematic diagram of a coordinating node, in accordance with some embodiments. Signaling concentrator 1000 includes processor 1002 and memory 1004, which are configured to provide the functions described herein. Also present are radio access network coordination/SON/scheduling module 1006, which performs the scheduling and scheduling coordination described herein, RAN proxying module 1008, and routing virtualization module 1010. In some embodiments, concentrator server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet). Signaling storm reduction functions may be performed in module 1006.

Coordinating node 1000 may include local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, TV whitespace (TVWS), or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

The following documents are also incorporated by reference in their entirety for all purposes: 3GPP TS 36.331, version 10.7.0, "Radio Resource Control (RRC); Protocol specification"; 3GPP TS 36.331, version 8.21.0, "Radio Resource Control (RRC); Protocol specification"; 3GPP TS 36.314, version 9.1.0, "Layer 2—Measurements"; 3GPP TS 36.214, version 10.1.0, "Physical Layer; Measurements"; 3GPP TS 23.203, version 10.4.0, "Policy and charging control architecture"; 3GPP TS 37.803-b10, version 11.1.0, "Mobility enhancements for Home Node B and Home enhanced Node B"; 3GPP TS 36.423, version 10.1.0, "X2 Application Protocol (X2AP)"; 3GPP TS 36.600, "E-UTRA and E-UTRAN; Overall Description"; 3GPP TS 36.213, "Evolved Universal Terrestrial Radio Access (E-UTRA); Physical layer procedures," version 10.13.0, and 3GPP Rel-10 description 20140630.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to Wi-Fi networks, networks in an unlicensed band, including 3GPP networks (LTE-U/LTE-AA), or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Accordingly, the disclosure of the present invention is intended to be illustrative of, but not limiting of, the scope of the invention.

Those of skill in the art will also recognize that hardware may embody software, software may be stored in hardware as firmware, and various modules and/or functions may be performed or provided either as hardware or software depending on the specific needs of a particular embodiment.

Although the scenarios for interference mitigation are described in relation to macro cells and femto cells, the same techniques could be used for reducing interference between any two cells, in which only one of the two cells is required to perform the interference mitigation methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the femto cell, the processing may also be performed in coordination with a cloud coordination server. The femto cell eNodeB may be in communication with the cloud coordination server via an X2 protocol connection, or another connection. The femto cell eNodeB may perform inter-cell coordination via the cloud communication server, when other cells are in communication with the cloud coordination server. The femto cell eNodeB may communicate with the cloud coordination server to determine whether the UE has the ability to support a handover to Wi-Fi.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, and in particular LTE Release 9, one of skill in the art would understand that these systems and methods could be adapted for use with other wireless standards or versions thereof, such as: UMTS; CDMA; EDGE; GSM; LTE-A; other 2G, 3G, or 4G standards; or any future wireless standards, including 5G standards.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure.

The invention claimed is:

1. A system, comprising:
a coordinating node in communication with both a radio access network and a core network; and
a first base station in the radio access network in communication with the coordinating node, wherein the radio access network is a 5G radio access network,
wherein:
the coordinating node has a coordinating scheduler with a first scheduling period;
the first base station has a first base station scheduler with a second scheduling period shorter than the first scheduling period;
the coordinating scheduler is configured to send a resource reservation list and a resource restriction list to the first base station scheduler once during each first scheduling period; and
the first base station is configured to receive the resource reservation list and the resource restriction list and to use the resource reservation list and the resource restriction list when performing mobile device resource scheduling; and
wherein the coordinating scheduler is configured to create an ordered list of base stations based on a computed number of cell edge devices.

2. The system of claim 1, wherein the resource reservation list and the resource restriction list are each bitmaps of one byte per physical resource block (PRB), or wherein the resource restriction list is a set of values indicating an interference level for each of a set of PRBs.

3. The system of claim 1, wherein the coordinating node is configured to maintain an interference zone comprising a set of base stations, and wherein the resource restriction list is pushed to each base station in the interference zone.

4. The system of claim 1, wherein the coordinating node is configured to assess interference based on received measurement reports from mobile devices.

5. The system of claim 1, wherein the coordinating scheduler and the first base station scheduler are configured to exchange scheduling information for UEs deemed to be cell edge UEs, based on one or more of reference signal received power (RSRP) and reference signal received quality (RSRQ) and signal to noise ratio (SINR).

6. The system of claim 1, wherein the first scheduling period is between 10 and 30 milliseconds and the second scheduling period is 1 millisecond.

7. The system of claim 1, wherein the coordinating node is in communication with a macro cell regarding resource allocation and scheduling over an X2 interface.

8. The system of claim 1, further comprising a second base station in the radio access network in communication with the coordinating node and having a scheduler.

9. The system of claim 1, wherein the first and second base stations are Long Term Evolution (LTE) eNodeBs, and wherein the coordinating node has an X2 interface connection to the first and second base stations for performing coordination between schedulers.

10. The system of claim 1, wherein the first base station sends a resource reservation to the coordinating node based on coordination activity performed with the second base station.

11. The system of claim 1, wherein the coordinating scheduler is configured to:
receive a resource reservation request from the first base station;
add a corresponding resource reservation to the resource reservation list; and
add a corresponding resource restriction to a second resource restriction list to be sent to the second base station.

12. The system of claim 1, wherein the coordinating scheduler is configured to send a reduce transmit power instruction to the second base station based on the resource reservation list.

13. The system of claim 1, wherein the first base station scheduler is configured to avoid use of resources identified in the resource restriction list.

14. The system of claim 1, wherein the first and second base stations are multi-radio access technology (multi-RAT) base stations having two or more of the following radio access capabilities: 2G; 3G; LTE; and Wi-Fi.

15. A method, comprising:
creating, at a scheduler, an ordered list of base stations based on a computed number of cell edge devices;
creating a reservation for a resource enabling use of the resource at a first base station for a set of mobile devices, the first base station being in the ordered list of base stations, wherein the resource is a 5G radio carrier resource;
requiring creation of a paired restriction for the resource disabling use of the resource at a second base station, the second base station being a neighbor of the first base station,
thereby enabling the second base station to avoid interfering with use of the reserved resource by the first base station.

16. The method of claim 15, wherein creating a reservation and requiring creation of a paired restriction occurs at a coordinating node.

17. The method of claim 15, wherein the resource is a physical radio resource or a scheduling slot.

18. The method of claim 15, wherein the coordinating node is a radio network controlling node situated in communication with a radio access network and with a core network.

19. The method of claim 15, wherein the coordinating node is a radio network controlling node providing virtualization of radio access network nodes.

20. The method of claim 15, wherein the first and second base stations are Long Term Evolution (LTE) eNodeBs and the set of mobile devices is either a set of universal mobile telecommunications service (UMTS) user equipments (UEs) or a set of LTE UEs.

\* \* \* \* \*